US011464375B2

(12) United States Patent
Gritsenko et al.

(10) Patent No.: US 11,464,375 B2
(45) Date of Patent: Oct. 11, 2022

(54) NAVIGATION OF AUTONOMOUS MOBILE ROBOTS

(71) Applicant: iRobot Corporation, Bedford, MA (US)

(72) Inventors: Artem Gritsenko, Malden, MA (US);
Erik Schembor, Bedford, MA (US);
James R. Salvati, North Chelmsford, MA (US); John Wang, Andover, MA (US); Jonathan J. Dorich, Billerica, MA (US); Steven Kordell, Arlington, MA (US); Tadvana S. Canakapalli, Arlington, MA (US); Zacharias Psarakis, Malden, MA (US)

(73) Assignee: iRobot Corporation, Bedford, MA (US)

( * ) Notice: Subject to any disclaimer, the term of this patent is extended or adjusted under 35 U.S.C. 154(b) by 551 days.

(21) Appl. No.: 16/120,993

(22) Filed: Sep. 4, 2018

(65) Prior Publication Data
US 2020/0069125 A1 Mar. 5, 2020

(51) Int. Cl.
*A47L 9/00* (2006.01)
*A47L 9/28* (2006.01)
(Continued)

(52) U.S. Cl.
CPC .............. *A47L 9/009* (2013.01); *A47L 9/2805* (2013.01); *A47L 9/2852* (2013.01); *A47L 11/24* (2013.01);
(Continued)

(58) Field of Classification Search
CPC ...... A47L 11/40; A47L 11/28; A47L 11/4088; A47L 9/009; A47L 9/2805; A47L 9/2852;
(Continued)

(56) References Cited

U.S. PATENT DOCUMENTS 8,452,450 B2   5/2013   Dooley et al.
8,855,914 B1   10/2014  Alexander et al.
(Continued)

FOREIGN PATENT DOCUMENTS

CN   106572776   4/2017
CN   206924042   1/2018
(Continued)

OTHER PUBLICATIONS

EP Supplementary Search Report in European Appln. No. 21180647.6, dated Dec. 23, 2021, 4 pages.
(Continued)

*Primary Examiner* — Katina N. Henson
(74) *Attorney, Agent, or Firm* — Fish & Richardson P.C.

(57) ABSTRACT

An autonomous cleaning robot includes a controller configured to execute instructions to perform one or more operations. The one or more operations includes operating a drive system to move the cleaning robot in a forward drive direction along a first obstacle surface with a side surface of the cleaning robot facing the first obstacle surface, then operating the drive system to turn the cleaning robot such that the side surface of the cleaning robot faces a second obstacle surface, then operating the drive system to move the cleaning robot in a rearward drive direction along the second obstacle surface, and then operating the drive system to move the cleaning robot in the forward drive direction along the second obstacle surface.

38 Claims, 15 Drawing Sheets

(51) Int. Cl.
*A47L 11/24* (2006.01)
*A47L 11/40* (2006.01)

(52) U.S. Cl.
CPC ....... *A47L 11/4011* (2013.01); *A47L 11/4061* (2013.01); *A47L 2201/04* (2013.01)

(58) Field of Classification Search
CPC .. A47L 11/24; A47L 11/4011; A47L 11/4061; A47L 9/2842; A47L 9/2857; A47L 2201/00; A47L 2201/04
USPC .................................. 15/49.1, 319; 701/400
See application file for complete search history.

(56) References Cited

U.S. PATENT DOCUMENTS

| | | |
|---|---|---|
| 8,961,695 B2 | 2/2015 | Romanov et al. |
| 9,427,127 B2 | 8/2016 | Dooley et al. |
| 9,615,712 B2 | 4/2017 | Dooley et al. |
| 2015/0166060 A1* | 6/2015 | Smith .................... G01S 15/88 701/23 |
| 2016/0296092 A1* | 10/2016 | Wolfe .................. G05D 1/0219 |
| 2016/0299503 A1 | 10/2016 | Wolfe et al. |

FOREIGN PATENT DOCUMENTS

| | | |
|---|---|---|
| EP | 3078315 | 10/2016 |
| JP | 2016002453 | 1/2016 |

OTHER PUBLICATIONS

EP Search Report in European Appln. No. 19195348.8, dated Feb. 3, 2020, 4 pages.

\* cited by examiner

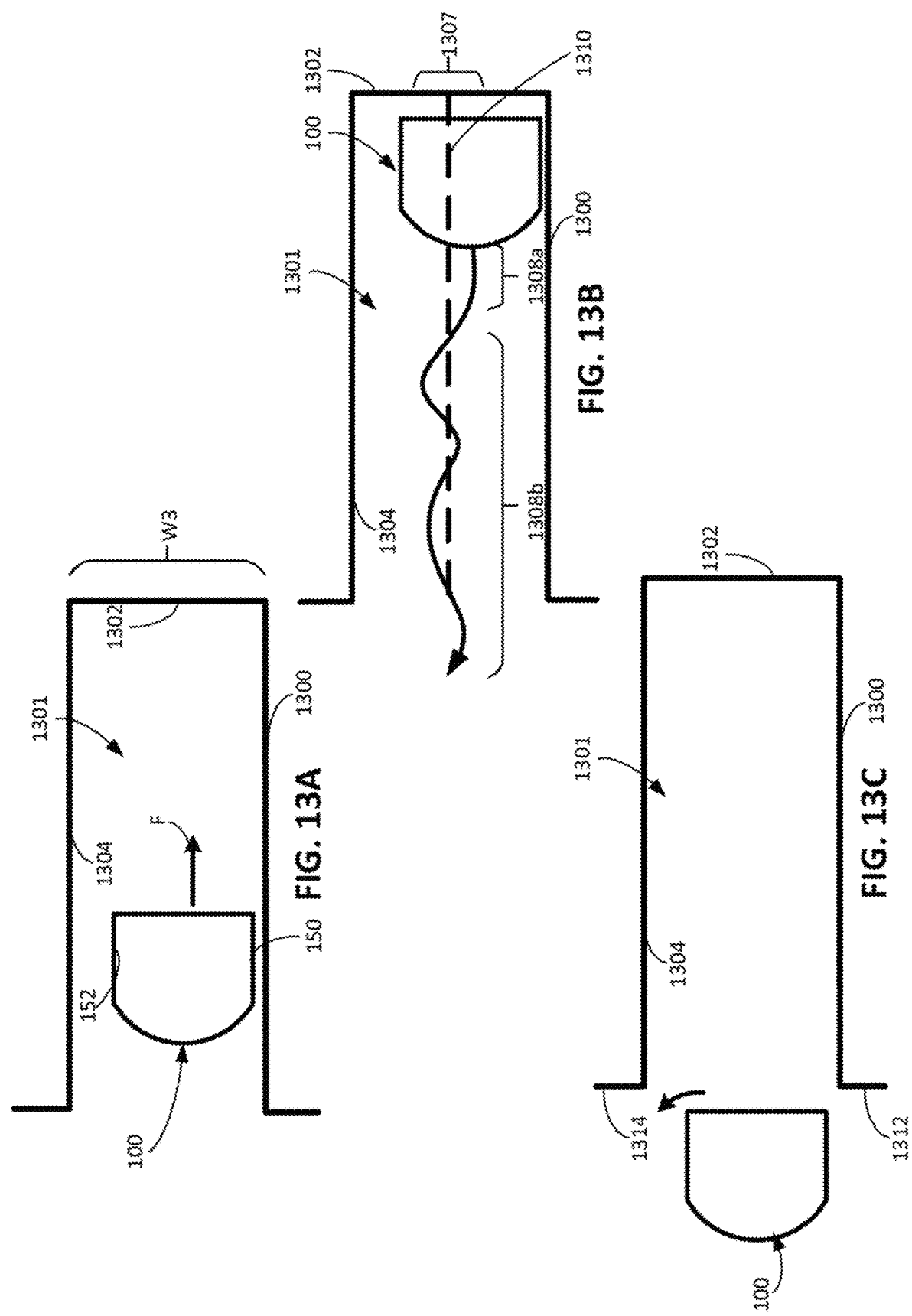

NAVIGATION OF AUTONOMOUS MOBILE ROBOTS

TECHNICAL FIELD

This specification relates to navigation of autonomous mobile robots.

BACKGROUND

Autonomous mobile robots can traverse floor surfaces to perform various operations, such as cleaning, vacuuming, and other operations. As an autonomous mobile robot traverses a floor surface, the robot may encounter an obstacle. The robot can be navigated to move along the obstacle. If the robot is a cleaning robot, as the robot moves along the obstacle, the robot can clean a portion of the floor surface adjacent the obstacle.

SUMMARY

Advantages of features described in this disclosure may include, but are not limited to, those described below and herein elsewhere. The systems, devices, methods, and other features described herein can improve the capability of autonomous cleaning robots to clean floor surfaces.

In some implementations, the autonomous cleaning robots described herein can provide cleaning of portions of a floor surface adjacent to obstacles in environments in which the autonomous cleaning robots are operating. For example, an autonomous cleaning robot can be navigated along a floor surface in a manner such that a cleaning path of the robot covers substantially all of a portion of a floor surface adjacent an obstacle surface. The robot can be navigated to cover a portion of the floor surface adjacent corner geometries and other interfaces between obstacle surfaces. The robot can thus be navigated around complex geometries of a room and be able to clean areas of a floor surface adjacent to these complex geometries.

In some implementations, the autonomous cleaning robots described herein can provide for improved cleaning of portions of a floor surface having narrow widths due to adjacent obstacles. For example, an autonomous cleaning robot can be navigated into a portion of a floor surface having a narrow width, e.g., a width that is 100% to 300% of an overall width of the robot, to clean the portion of the floor surface. The robot can clean this portion of the floor surface and be able to be navigated out of the portion of the floor surface back into a portion of the floor surface that does not have a narrow width. In this regard, the robot can easily clean narrow hallways, crevices, or other features of a room without becoming stuck in those areas.

In one aspect, an autonomous cleaning robot includes a forward portion having a forward surface extending along a forward plane, a first side surface extending along a first side plane, and a second side surface extending along a second side plane. The forward plane is perpendicular to the first side plane and the second side plane. The robot includes a drive system configured to support the cleaning robot on a floor surface, and a cleaning inlet positioned forward of a center of the cleaning robot and along the forward portion of the cleaning robot between the first side surface and the second side surface. The cleaning inlet is configured to collect debris from the floor surface into the cleaning robot. The robot includes a controller configured to execute instructions to perform one or more operations. The one or more operations includes operating the drive system to move the cleaning robot in a forward drive direction along a first obstacle surface with the first side surface of the cleaning robot facing the first obstacle surface, then operating the drive system to turn the cleaning robot such that the first side surface of the cleaning robot faces a second obstacle surface, then operating the drive system to move the cleaning robot in a rearward drive direction along the second obstacle surface, and then operating the drive system to move the cleaning robot in the forward drive direction along the second obstacle surface.

Implementations can include the examples described below and herein elsewhere.

In some implementations, operating the drive system to turn the cleaning robot such that the first side surface of the cleaning robot faces the second obstacle surface includes operating the drive system to move the cleaning robot along a trajectory including an arcuate portion.

In some implementations, the cleaning robot further includes an obstacle following sensor positioned at a location along the first side surface of the cleaning robot, the one or more operations further include detecting, using the obstacle following sensor, that the location of the obstacle following sensor is forward of the first obstacle surface, and operating the drive system to turn the cleaning robot such that the first side surface of the cleaning robot faces the second obstacle surface includes operating the drive system to turn the cleaning robot in response to detecting that the location of the obstacle following sensor is forward of the first obstacle surface. In some implementations, the obstacle following sensor is positioned to emit a signal in a horizontal direction perpendicular to the first side surface of the cleaning robot. In some implementations, detecting that the location of the obstacle following sensor is forward of the first obstacle surface includes detecting that the location of the obstacle following sensor is forward of the first obstacle surface by a distance of at least 1 centimeters to 15 centimeters.

In some implementations, operating the drive system to turn the cleaning robot such that the first side surface of the cleaning robot faces the second obstacle surface includes operating the drive system to turn the cleaning robot until the cleaning robot detects the second obstacle surface. In some implementations, operating the drive system to turn the cleaning robot until the cleaning robot detects the second obstacle surface includes detecting, using a bump sensor of the cleaning robot, the second obstacle surface in response to contact between the cleaning robot and the second obstacle surface. In some implementations, operating the drive system to turn the cleaning robot until the cleaning robot detects the second obstacle surface includes detecting, using an obstacle following sensor of the cleaning robot, the second obstacle surface in response to the first side surface of the cleaning robot being adjacent to the second obstacle surface.

In some implementations, operating the drive system to turn the cleaning robot such that the first side surface of the cleaning robot faces the second obstacle surface includes operating the drive system to move the cleaning robot along a cleaning path that does not pass through a portion of the floor surface extending from proximate an interface between the first obstacle surface and the second obstacle surface and along the second obstacle surface. In some implementations, a length of the portion of the floor surface is at least 1 centimeter. In some implementations, operating the drive system to move the cleaning robot in the rearward drive direction along the second obstacle surface includes operating the drive system to move the cleaning robot in the rearward direction through the portion of the floor surface.

In some implementations, operating the drive system to move the cleaning robot in the rearward drive direction along the second obstacle surface includes operating the drive system to move the cleaning robot a distance in the rearward drive direction. In some implementations, the distance is between 1 centimeter and 60 centimeters. In some implementations, the cleaning robot further includes an obstacle following sensor positioned at a location along the first side surface of the cleaning robot, the one or more operations further include detecting, using the obstacle following sensor, that the location of the obstacle following sensor is rearward of the second obstacle surface, and operating the drive system to move the cleaning robot in the forward drive direction along the second obstacle surface includes operating the drive system to move the cleaning robot in the forward drive direction along the second obstacle surface in response to detecting that the location of the obstacle following sensor is rearward of the second obstacle surface.

In some implementations, operating the drive system to move the cleaning robot in the forward drive direction along the second obstacle surface includes operating the drive system to turn the cleaning robot away from the second obstacle surface and move the cleaning robot in the forward drive direction such that the forward drive direction of the cleaning robot is angled relative to the second obstacle surface and such that the first side surface of the cleaning robot moves away from the second obstacle surface as the cleaning robot moves in the forward drive direction. In some implementations, the cleaning robot further includes an obstacle following sensor positioned along the first side surface of the cleaning robot, the one or more operations further include detecting, using the obstacle following sensor, the second obstacle surface, and operating the drive system to turn the cleaning robot away from the second obstacle surface and move the cleaning robot in the forward drive direction such that the forward drive direction of the cleaning robot is angled relative to the second obstacle surface and such that the first side surface of the cleaning robot moves away from the second obstacle surface as the cleaning robot moves in the forward drive direction includes operating the drive system to move the cleaning robot in the forward drive direction until detecting the second obstacle surface. In some implementations, operating the drive system to turn the cleaning robot away from the second obstacle surface and move the cleaning robot in the forward drive direction such that the forward drive direction of the cleaning robot is angled relative to the second obstacle surface and such that the first side surface of the cleaning robot moves away from the second obstacle surface as the cleaning robot moves in the forward drive direction includes operating the drive system to move the cleaning robot in the forward drive direction for a distance. In some implementations, the distance is between 50% and 150% of a length of the cleaning robot. In some implementations, the one or more operations further include operating the drive system to turn the cleaning robot toward the second obstacle surface in response to detecting the second obstacle surface, and then operating the drive system to move the cleaning robot along the second obstacle surface.

In some implementations, the cleaning robot further includes a rotatable cleaning member positioned adjacent to the cleaning inlet, the rotatable cleaning member extending horizontally across the forward portion of the cleaning robot and rotatable about a horizontal axis to move debris toward the cleaning inlet. In some implementations, the rotatable cleaning member extends across 75% to 95% of a total width of the cleaning robot.

In another aspect, an autonomous cleaning robot includes a forward portion having a forward surface extending along a forward plane, a first side surface extending along a first side plane, and a second side surface extending along a second side plane. The forward plane is perpendicular to the first side plane and the second side plane. The cleaning robot includes a drive system configured to support the cleaning robot on a floor surface, and a cleaning inlet positioned forward of a center of the cleaning robot and along the forward portion of the cleaning robot between the first side surface and the second side surface. The cleaning inlet is configured to collect debris from the floor surface into the cleaning robot. The cleaning robot includes a controller configured to execute instructions to perform one or more operations. The one or more operations includes operating the drive system to move the cleaning robot in a forward drive direction along a first obstacle surface with the first side surface of the cleaning robot facing the first obstacle surface, then operating the drive system to repeatedly cause the cleaning robot to perform a series of movements, and then operating the drive system to move the cleaning robot in the forward drive direction along the second obstacle surface with the first side surface of the cleaning robot facing the second obstacle surface. The series of movements includes moving in a rearward drive direction a distance along the first obstacle surface, then turning away from the first obstacle surface until the cleaning robot detects contact between a second obstacle surface and a forward surface of the cleaning robot, and then turning back toward the first obstacle surface. The second obstacle surface is adjacent to the first obstacle surface and angled relative to the first obstacle surface.

Implementations can include the examples described below and herein elsewhere.

In some implementations, operating the drive system to move the cleaning robot in the forward drive direction along the first obstacle surface with the first side surface of the cleaning robot facing the first obstacle surface includes operating the drive system to move the cleaning robot in the forward drive direction until the cleaning robot detects the second obstacle surface. In some implementations, operating the drive system to move the cleaning robot in the forward drive direction until the cleaning robot detects the second obstacle surface includes detecting, using a bump sensor of the cleaning robot, the second obstacle surface in response to contact between the second obstacle surface and the cleaning robot. In some implementations, the one or more operations further includes operating the drive system to maintain a position of the cleaning robot for at least one to five seconds in response to detecting the second obstacle surface. In some implementations, the cleaning robot further includes a side brush positioned proximate the forward surface of the cleaning robot and proximate the first side surface of the cleaning robot, and operating the drive system to maintain a position of the cleaning robot for at least one to five seconds in response to detecting the second obstacle surface includes operating the drive system to maintain a portion of the floor surface adjacent to an interface between the first obstacle surface and the second obstacle surface within a cleaning region of the side brush. In some implementations, operating the drive system to move the cleaning robot in the forward drive direction until the cleaning robot detects the second obstacle surface includes emitting a signal toward the second obstacle surface, and detecting the second obstacle surface by detecting, using a camera, a reflection of the signal.

In some implementations, the distance is between 2 and 15 centimeters.

In some implementations, operating the drive system to repeatedly cause the cleaning robot to perform the series of movements includes operating the drive system to cause the cleaning robot to perform the series of movements at least two to five times.

In some implementations, operating the drive system to repeatedly cause the cleaning robot to perform the series of movements includes operating the drive system to cause the cleaning robot to perform the series of movements until the forward drive direction of the cleaning robot and the first obstacle surface form an angle. In some implementations, the angle is at least 30 to 60 degrees.

In some implementations, the cleaning robot further includes a side brush positioned proximate the forward surface of the cleaning robot and proximate the first side surface of the cleaning robot, and operating the drive system to repeatedly cause the cleaning robot to perform the series of movements includes causing the side brush to traverse a region of the floor surface extending along the second obstacle surface from proximate an interface between the first obstacle surface and the second obstacle surface. In some implementations, causing the side brush to traverse the region of the floor surface includes causing a cleaning region of the side brush to traverse a different portion of the region of the floor surface each time the cleaning robot turns away from the first obstacle surface until the cleaning robot detects contact between the second obstacle surface and the cleaning robot.

In some implementations, the series of movements of the cleaning robot further includes, after turning back toward the first obstacle surface, turning the cleaning robot away from the first obstacle surface.

In another aspect an autonomous cleaning robot includes a forward portion having a forward surface extending along a forward plane, a first side surface extending along a first side plane, and a second side surface extending along a second side plane. The forward plane is perpendicular to the first side plane and the second side plane. The cleaning robot includes a drive system configured to support the cleaning robot on a floor surface, and a cleaning inlet positioned forward of a center of the cleaning robot and along the forward portion of the cleaning robot between the first side surface and the second side surface. The cleaning inlet is configured to collect debris from the floor surface into the cleaning robot. The cleaning robot includes a controller configured to execute instructions to perform one or more operations. The one or more operations includes operating the drive system to move the cleaning robot in a forward drive direction along a first obstacle surface until the cleaning robot detects contact between a second obstacle surface and the cleaning robot, then operating the drive system to move the cleaning robot away from the second obstacle surface along a rearward drive direction, then operating the drive system to turn the cleaning robot toward the first obstacle surface and then away from the first obstacle surface, and then operating the drive system to move the cleaning robot in a rearward drive direction along the first obstacle surface. The first obstacle surface is positioned a distance from a third obstacle surface no more than 100% to 150% of an overall width of the cleaning robot.

Implementations can include the examples described below and herein elsewhere.

In some implementations, the cleaning robot further includes a sensor system configured to generate a map of the floor surface, the one or more operations includes determining, based on the map, that the distance between the first obstacle surface and the third obstacle surface is between 100% and 150% of the overall width of the cleaning robot, and operating the drive system to turn the cleaning robot toward the first obstacle and then away from the first obstacle surface includes operating the drive system to turn the cleaning robot toward the first obstacle and then away from the first obstacle surface in response to determining that the distance is between 100% and 150% of the overall width of the cleaning robot.

In some implementations, operating the drive system to turn the cleaning robot toward the first obstacle surface and then away from the first obstacle surface includes operating the drive system to turn the cleaning robot toward the first obstacle surface until a bump sensor of the cleaning robot detects contact between the cleaning robot and the first obstacle surface. In some implementations, operating the drive system to turn the cleaning robot toward the first obstacle surface and then away from the first obstacle surface includes operating the drive system to turn the cleaning robot away from the first obstacle surface until the bump sensor of the cleaning robot no longer detects contact between the cleaning robot and the first obstacle surface.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

FIGS. 5A-5E, 7A-7F, 9A-9H, 11A-11F, and 13A-13C show sets of diagrams illustrating an autonomous mobile robot during the processes of FIGS. 4, 6, 8, 10, and 12, respectively.

Like reference numbers and designations in the various drawings indicate like elements.

DETAILED DESCRIPTION

Figure 1:
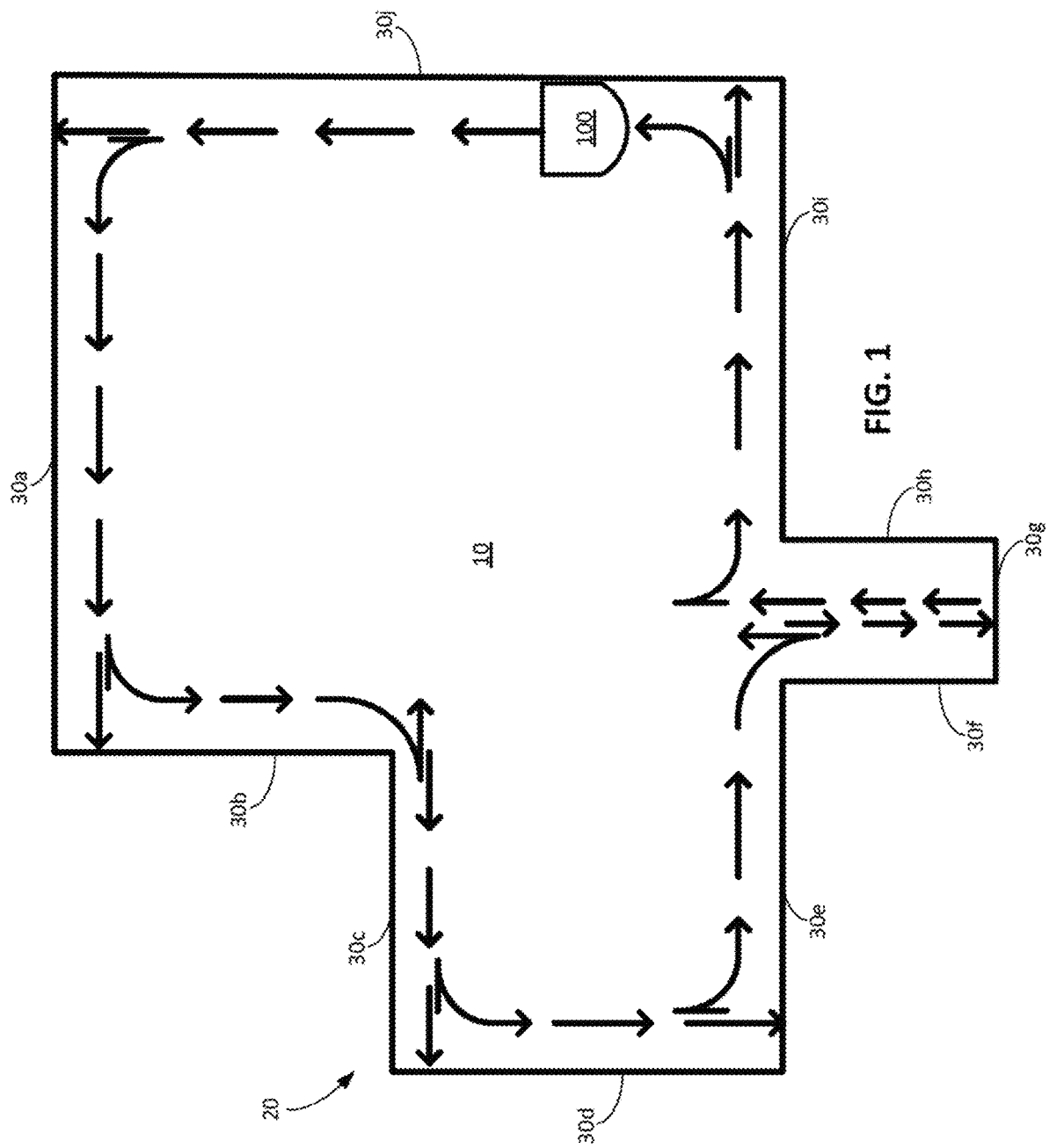
FIG. 1 is a top schematic view of an environment in which an autonomous cleaning robot is moving.

Referring to FIG. 1, an autonomous mobile robot 100 autonomously moves about a floor surface 10 in a room 20. For example, the robot 100 is an autonomous mobile floor cleaning robot that performs a cleaning operation in which the robot 100 is propelled across the floor surface 10 while the robot 100 cleans the floor surface 10. In some implementations, during the cleaning operation, referring to FIG. 2, the robot 100 collects debris from the floor surface 10 as the robot 100 traverses the floor surface 10.

Referring back to FIG. 1, the room 20 includes multiple obstacle surfaces 30a-30j along which the robot 100 can be navigated. In an obstacle following behavior, the robot 100 can navigate along a path adjacent an obstacle surface to clean a portion of the floor surface 10 adjacent to the obstacle surface. As described herein, the robot 100 can clean portions of the floor surface 10 adjacent to complex geometries formed from the obstacle surfaces 30a-30j by collecting sensor data to detect the obstacle surfaces 30a-30j and performing different series of movements along the obstacle surfaces 30a-30j while using the sensor data to maneuver about the floor surface 10.

Example Systems

Figure 2:
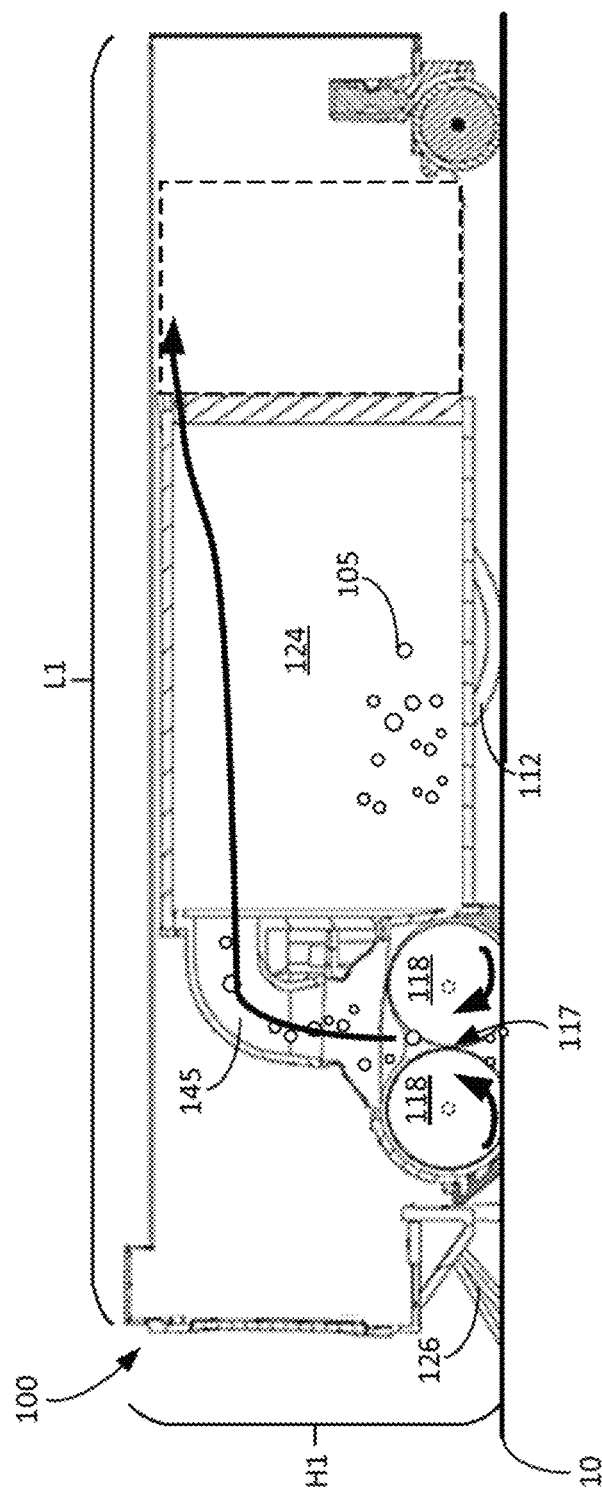
FIG. 2 is a side cross-sectional view of an autonomous cleaning robot collecting debris from a floor surface.
Figure 3A:
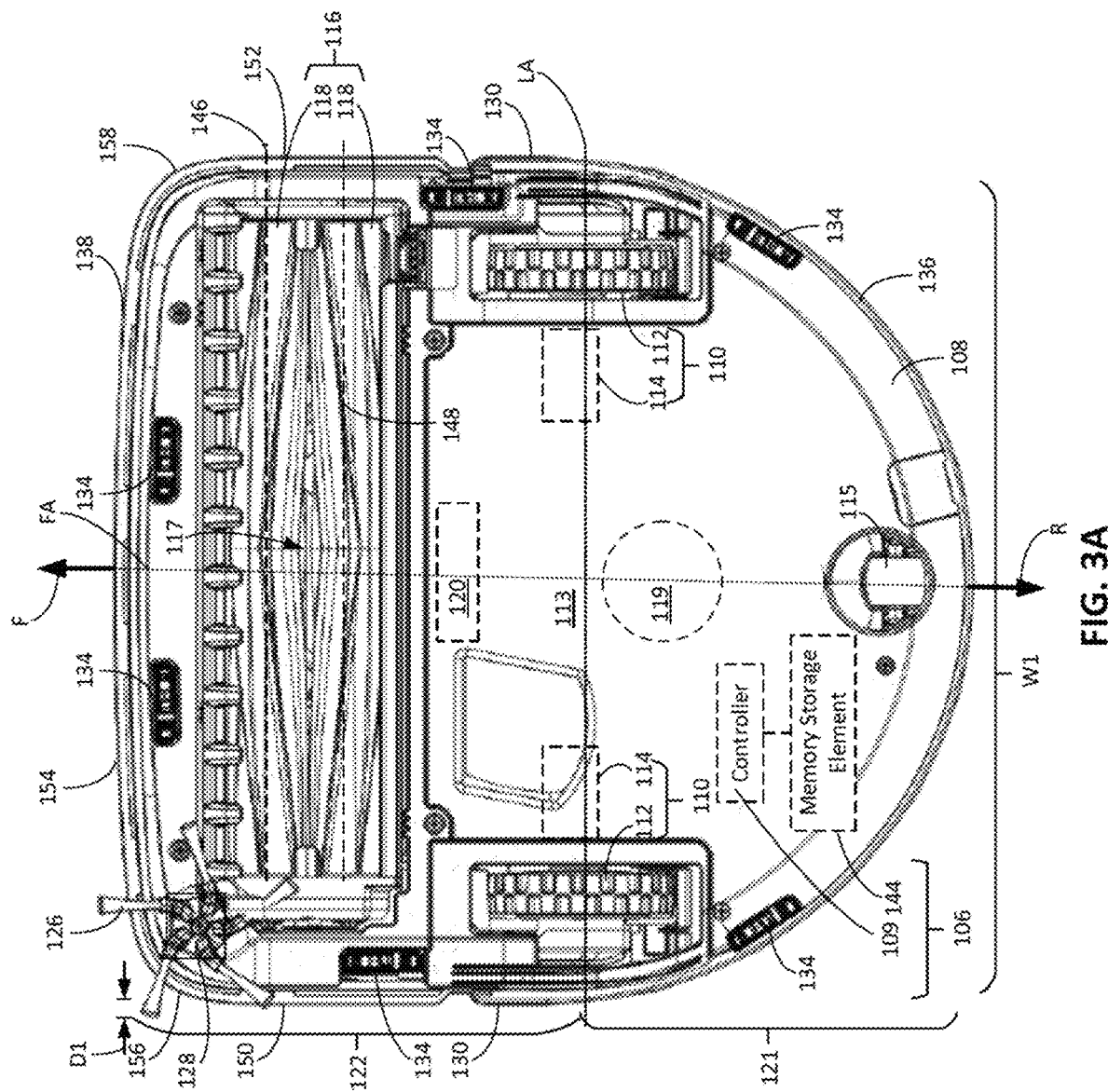
FIGS. 3A-3C are bottom, top perspective, and top schematic views of an autonomous cleaning robot.
Figure 3B:
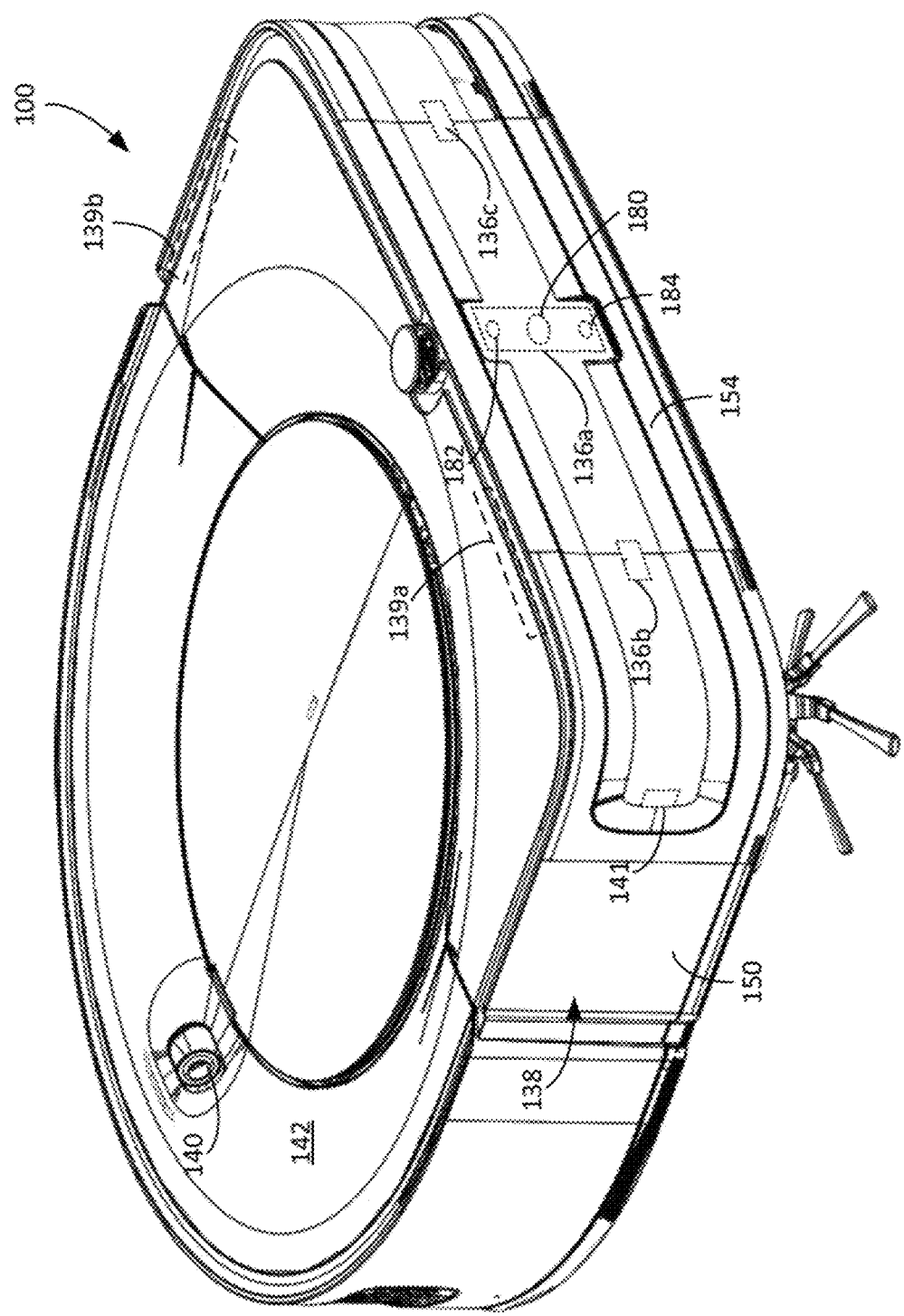
Figure 3C:
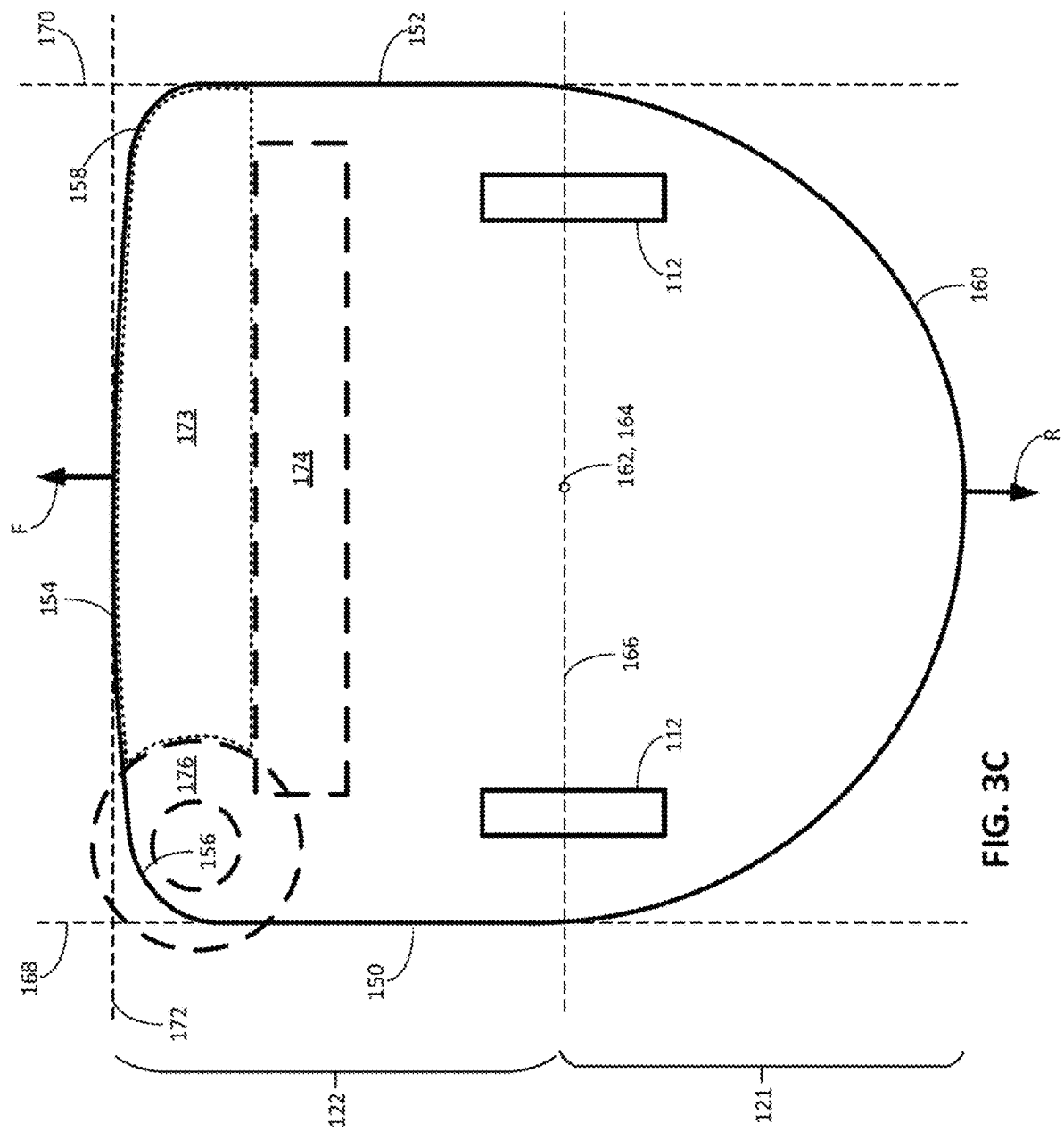

FIGS. 3A-3C depict an example of the robot 100. Referring to FIG. 3A, the robot 100 includes a robot housing infrastructure 108. The housing infrastructure 108 can define the structural periphery of the robot 100. In some examples, the housing infrastructure 108 includes a chassis, cover, bottom plate, and bumper assembly. The robot 100 is a household robot that has a small profile so that the robot 100 can fit under furniture within a home. For example, a height H1 (shown in FIG. 2) of the robot 100 relative to the floor surface is, for example, no more than 13 centimeters. The robot 100 is also compact. An overall length L1 (shown in FIG. 2) of the robot 100 and an overall width W1 (shown in FIG. 3A) are each between 30 and 60 centimeters, e.g., between 30 and 40 centimeters, 40 and 50 centimeters, or 50 and 60 centimeters. The overall width W1 can correspond to a width of the housing infrastructure 108 of the robot 100.

The robot 100 includes a drive system 110 including one or more drive wheels. The drive system 110 further includes one or more electric motors including electrically driven portions forming part of the electrical circuitry 106. The housing infrastructure 108 supports the electrical circuitry 106, including at least a controller 109, within the robot 100.

The drive system 110 is operable to propel the robot 100 across the floor surface 10. The robot 100 can be propelled in a forward drive direction F or a rearward drive direction R. The robot 100 can also be propelled such that the robot 100 turns in place or turns while moving in the forward drive direction F or the rearward drive direction R. In the example depicted in FIG. 3A, the robot 100 includes drive wheels 112 extending through a bottom portion 113 of the housing infrastructure 108. The drive wheels 112 are rotated by motors 114 to cause movement of the robot 100 along the floor surface 10. The robot 100 further includes a passive caster wheel 115 extending through the bottom portion 113 of the housing infrastructure 108. The caster wheel 115 is not powered. Together, the drive wheels 112 and the caster wheel 115 cooperate to support the housing infrastructure 108 above the floor surface 10. For example, the caster wheel 115 is disposed along a rearward portion 121 of the housing infrastructure 108, and the drive wheels 112 are disposed forward of the caster wheel 115.

Referring to FIGS. 3A and 3C, the robot 100 includes a forward portion 122 that is substantially rectangular and a rearward portion 121 that is substantially semicircular. The forward portion 122 includes side surfaces 150, 152, a forward surface 154, and corner surfaces 156, 158. The corner surfaces 156, 158 of the forward portion 122 connect the side surface 150, 152 to the forward surface 154. The rearward portion 121 includes a rounded surface 160. The rounded surface 160 define a semicircular portion of a perimeter of the housing infrastructure 108 of the robot 100. The semicircular portion of the perimeter of the housing infrastructure 108 corresponds to a portion of a circle having a center 162. The center 162, in addition to being a center of the circle, can correspond to a center of rotation 164 of the robot 100 as the robot 100 turns in place. In this regard, the center 162 can be positioned between the drive wheels 112 of the robot 100. For example, a vertical plane 166 extending through the center 162 can extend through centers of the drive wheels 112. The center 162 can correspond to a lengthwise center of the robot 100, a widthwise center of the robot 100, or both.

The vertical plane 166 can separate the rearward portion 121 of the robot 100 from the forward portion 122 of the robot 100. The side surfaces 150, 152 of the forward portion 122 extend along vertical planes 168, 170 that are parallel to one another. The side surfaces 150, 152 and the vertical planes 168, 170 can each be parallel with the forward drive direction F (shown in FIG. 3A) of the robot 100. The forward surface 154 of the forward portion 122 extends along a vertical plane 172. The vertical plane 172 is perpendicular to the planes 168, 170 and is parallel to the vertical plane 166. The vertical plane 172 can be perpendicular to the forward drive direction F of the robot 100. The vertical planes 166, 168, 170, 172 thus bound a rectangular area within which a footprint of the forward portion 122 is positioned. The footprint of the forward portion 122 can cover, for example, at least 90%, at least 95%, or at least 100% of a total area of the rectangular area. In some implementations, the footprint of the forward portion 122 of the robot 100 can be positioned entirely within the rectangular area bounded by the vertical planes 166, 168, 170, 172. For example, the footprint of the forward portion 122 do not cross over the vertical planes 166, 168, 170, 172. The side surface 150, the side surface 152, and the forward surface 154 intersect but do not cross over the vertical planes 166, 168, 170, 172.

In the example depicted in FIGS. 2, 3A, and 3B, the robot 100 is an autonomous mobile floor cleaning robot that includes a cleaning assembly 116 (shown in FIG. 3A) operable to clean the floor surface 10. For example, the robot 100 is a vacuum cleaning robot in which the cleaning assembly 116 is operable to clean the floor surface 10 by ingesting debris 105 (shown in FIG. 2) from the floor surface 10. The cleaning assembly 116 includes a cleaning inlet 117 through which debris is collected by the robot 100. The cleaning inlet 117 is positioned forward of a center of the robot 100, e.g., the center 162 or the center of rotation 164, and along the forward portion 122 of the robot 100 between the side surfaces 150, 152 of the forward portion 122.

The cleaning assembly 116 includes one or more rotatable members, e.g., rotatable members 118 driven by a motor 120. The rotatable members 118 extend horizontally across the forward portion 122 of the robot 100. The rotatable members 118 are positioned along a forward portion 122 of the housing infrastructure 108, and extend along 75% to 95% of a width of the forward portion 122 of the housing infrastructure 108, e.g., corresponding to an overall width W1 of the robot 100. Referring also to FIG. 2, the cleaning inlet 117 is positioned between the rotatable members 118.

As shown in FIG. 2, the rotatable members 118 are rollers that counter rotate relative to one another. For example, the rotatable members 118 can be rotatable about parallel horizontal axes 146, 148 (shown in FIG. 3A) to agitate debris 105 on the floor surface 10 and direct the debris 105 toward the cleaning inlet 117, into the cleaning inlet 117, and into a suction pathway 145 in the robot 100. Referring back to FIG. 3A, the rotatable members 118 can be positioned entirely within the forward portion 122 of the robot 100. The rotatable members 118 include elastomeric shells that contact debris 105 on the floor surface 10 to direct debris 105 through the cleaning inlet 117 between the rotatable members 118 and into an interior of the robot 100, e.g., into a debris bin 124 (shown in FIG. 2), as the rotatable members 118 rotate relative to the housing infrastructure 108. The rotatable members 118 further contact the floor surface 10 to agitate debris 105 on the floor surface 10.

The robot 100 further includes a vacuum assembly 119 operable to generate an airflow through the cleaning inlet 117 between the rotatable members 118 and into the debris bin 124. The vacuum assembly 119 includes an impeller and a motor to rotate the impeller to generate the airflow. The vacuum assembly 119 cooperates with the cleaning assembly 116 to draw debris 105 from the floor surface 10 into the debris bin 124. In some cases, the airflow generated by the vacuum assembly 119 creates sufficient force to draw debris 105 on the floor surface 10 upward through the gap between the rotatable members 118 into the debris bin 124. In some cases, the rotatable members 118 contact the floor surface 10 to agitate the debris 105 on the floor surface 10, thereby allowing the debris 105 to be more easily ingested by the airflow generated by the vacuum assembly 119.

The robot 100 further includes a brush 126 that rotates about a non-horizontal axis, e.g., an axis forming an angle between 75 degrees and 90 degrees with the floor surface 10. The non-horizontal axis, for example, forms an angle between 75 degrees and 90 degrees with the longitudinal axes of the rotatable members 118. The robot 100 includes a motor 128 operably connected to the brush 126 to rotate the brush 126.

The brush 126 is a side brush laterally offset from a fore-aft axis FA of the robot 100 such that the brush 126 extends beyond an outer perimeter of the housing infrastructure 108 of the robot 100. For example, the brush 126 can extend beyond one of the side surfaces 150, 152 of the robot 100 and can thereby be capable of engaging debris on portions of the floor surface 10 that the rotatable members 118 typically cannot reach, e.g., portions of the floor surface 10 outside of a portion of the floor surface 10 directly underneath the robot 100. The brush 126 is also forwardly offset from a lateral axis LA of the robot 100 such that the brush 126 also extends beyond the forward surface 154 of the housing infrastructure 108. As depicted in FIG. 3A, the brush 126 extends beyond the side surface 150, the corner surface 156, and the forward surface 154 of the housing infrastructure 108. In some implementations, a horizontal distance D1 that the brush 126 extends beyond the side surface 150 is at least, for example, 0.2 centimeters, e.g., at least 0.25 centimeters, at least 0.3 centimeters, at least 0.4 centimeters, at least 0.5 centimeters, at least 1 centimeter, or more. The brush 126 is positioned to contact the floor surface 10 during its rotation so that the brush 126 can easily engage the debris 105 on the floor surface 10.

The brush 126 is rotatable about the non-horizontal axis in a manner that brushes debris on the floor surface 10 into a cleaning path of the cleaning assembly 116 as the robot 100 moves. For example, in examples in which the robot 100 is moving in the forward drive direction F, the brush 126 is rotatable in a clockwise direction (when viewed from a perspective above the robot 100) such that debris that the brush 126 contacts moves toward the cleaning assembly and toward a portion of the floor surface 10 in front of the cleaning assembly 116 in the forward drive direction F. As a result, as the robot 100 moves in the forward drive direction F, the cleaning inlet 117 of the robot 100 can collect the debris swept by the brush 126. In examples in which the robot 100 is moving in the rearward drive direction R, the brush 126 is rotatable in a counterclockwise direction (when viewed from a perspective above the robot 100) such that debris that the brush 126 contacts moves toward a portion of the floor surface 10 behind the cleaning assembly 116 in the rearward drive direction R. As a result, as the robot 100 moves in the rearward drive direction R, the cleaning inlet 117 of the robot 100 can collect the debris swept by the brush 126.

FIG. 3C illustrates a cleaning region 174 and a cleaning region 176 for the robot 100. The cleaning region 174 corresponds to a region below the robot 100 on the floor surface 10 of the robot 100. The cleaning region 174 can be substantially rectangular and has a width corresponding to a width of one or both of the rotatable members 118. Debris within the cleaning region 174 can be swept up by the rotatable members 118 of the robot 100 into the cleaning inlet 117.

The cleaning region 176 corresponds to a region below the robot 100 on the floor surface 10 of the robot 100. The cleaning region 176 can be annular. An outer perimeter and an inner perimeter of the cleaning region 174 can be circular. As the robot 100 is moving in the forward drive direction F, debris within the cleaning region 176 can be swept by the brush 126 from a portion of the floor surface 10 offset laterally from the cleaning region 174 to a portion of the floor surface 10 that is within or forward of the cleaning region 174 and is thus within a cleaning path of the robot 100 as the robot 100 moves in the forward drive direction F of the robot 100. As the robot 100 is moving in the rearward drive direction R, debris within the cleaning region 176 can be swept by the brush 126 from a portion of the floor surface 10 offset laterally from the cleaning region 174 to a portion of the floor surface 10 that is within or rearward of the cleaning region 174 and is thus within a cleaning path of the robot 100 as the robot 100 moves in the rearward drive direction R of the robot 100.

The electrical circuitry 106 includes, in addition to the controller 109, a memory storage element 144 and a sensor system with one or more electrical sensors. The controller 109 is configured to execute instructions to perform one or more operations as described herein. The memory storage element 144 is accessible by the controller 109 and disposed within the housing infrastructure 108. The one or more electrical sensors are configured to detect features in an environment of the robot 100. For example, referring to FIG. 3A, the sensor system includes cliff sensors 134 disposed along the bottom portion 113 of the housing infrastructure 108. Each of the cliff sensors 134 is an optical sensor that can detect the presence or the absence of an object below the optical sensor, such as the floor surface 10. The cliff sensors 134 can thus detect obstacles such as drop-offs and cliffs below portions of the robot 100 where the cliff sensors 134 are disposed and redirect the robot accordingly.

Referring to FIG. 3B, the sensor system includes one or more proximity sensors that can detect objects along the floor surface 10 that are near the robot 100. For example, the sensor system can include proximity sensors 136a, 136b, 136c disposed proximate the forward surface 154 of the housing infrastructure 108. Each of the proximity sensors 136a, 136b, 136c includes an optical sensor facing outward from the forward surface 154 of the housing infrastructure 108 and that can detect the presence or the absence of an object in front of the optical sensor. For example, the detectable objects include obstacles such as furniture, walls, persons, and other objects in the environment of the robot 100.

The sensor system includes a bumper system including the bumper 138 and one or more bump sensors that detect contact between the bumper 138 and obstacles in the environment. The bumper 138 forms part of the housing infrastructure 108. For example, the bumper 138 can form the side surfaces 150, 152 as well as the forward surface 154.

The sensor system, for example, can include the bump sensors 139a, 139b. The bump sensors 139a, 139b can include break beam sensors, capacitive sensors, or other sensors that can detect contact between the robot 100, e.g., the bumper 138, and objects in the environment. In some implementations, the bump sensor 139a can be used to detect movement of the bumper 138 along the fore-aft axis FA (shown in FIG. 3A) of the robot 100, and the bump sensor 139b can be used to detect movement of the bumper 138 along the lateral axis LA (shown in FIG. 3A) of the robot 100. The proximity sensors 136a, 136b, 136c can detect objects before the robot 100 contacts the objects, and the bump sensors 139a, 139b can detect objects that contact the bumper 138, e.g., in response to the robot 100 contacting the objects.

The sensor system includes one or more obstacle following sensors. For example, the robot 100 can include an obstacle following sensor 141 along the side surface 150. The obstacle following sensor 141 includes an optical sensor facing outward from the side surface 150 of the housing infrastructure 108 and that can detect the presence or the absence of an object adjacent to the side surface 150 of the housing infrastructure 108. The obstacle following sensor 141 can emit an optical beam horizontally in a direction perpendicular to the forward drive direction F of the robot 100 and perpendicular to the side surface 150 of the robot 100. For example, the detectable objects include obstacles such as furniture, walls, persons, and other objects in the environment of the robot 100. In some implementations, the sensor system can include an obstacle following sensor along the side surface 152, and the obstacle following sensor can detect the presence or the absence an object adjacent to the side surface 152. The obstacle following sensor 141 along the side surface 150 is a right obstacle following sensor, and the obstacle following sensor along the side surface 152 is a left obstacle following sensor. The one or more obstacle following sensors, including the obstacle following sensor 14, can also serve as obstacle detection sensors, e.g., similar to the proximity sensors described herein. In this regard, the left obstacle following can be used to determine a distance between an object, e.g., an obstacle surface, to the left of the robot 100 and the robot 100, and the right obstacle following sensor can be used to determine a distance between an object, e.g., an obstacle surface, to the right of the robot 100 and the robot 100.

In some implementations, at least some of the proximity sensors 136a, 136b, 136c, and the obstacle following sensor 141 each includes an optical emitter and an optical detector. The optical emitter emits an optical beam outward from the robot 100, e.g., outward in a horizontal direction, and the optical detector detects a reflection of the optical beam that reflects off an object near the robot 100. The robot 100, e.g., using the controller 109, can determine a time of flight of the optical beam and thereby determine a distance between the optical detector and the object, and hence a distance between the robot 100 and the object.

In some implementations, the proximity sensor 136a includes an optical detector 180 and multiple optical emitters 182, 184. One of the optical emitters 182, 184 can be positioned to direct an optical beam outwardly and downwardly, and the other of the optical emitters 182, 184 can be positioned to direct an optical beam outwardly and upwardly. The optical detector 180 can detect reflections of the optical beams or scatter from the optical beams. In some implementations, the optical detector 180 is an imaging sensor, a camera, or some other type of detection device for sensing optical signals. In some implementations, the optical beams illuminate horizontal lines along a planar vertical surface forward of the robot 100. In some implementations, the optical emitters 182, 184 each emit a fan of beams outward toward an obstacle surface such that a one-dimensional grid of dots appear on one or more obstacle surfaces. The one-dimensional grid of dots can be positioned on a horizontally extending line. In some implementations, the grid of dots can extend across multiple obstacle surfaces, e.g., multiple obstacles surfaces adjacent to one another. The optical detector 180 can capture an image representative of the grid of dots formed by the optical emitter 182 and the grid of dots formed by the optical emitter 184. Based on a size of a dot in the image, the robot 100 can determine a distance of an object on which the dot appears relative to the optical detector 180, e.g., relative to the robot 100. The robot 100 can make this determination for each of the dots, thus allowing the robot 100 to determine a shape of an object on which the dots appear. In addition, if multiple objects are ahead of the robot 100, the robot 100 can determine a shape of each of the objects. In some implementations, the objects can include one or more objects that are laterally offset from a portion of the floor surface 10 directly in front of the robot 100.

The sensor system further includes an image capture device 140, e.g., a camera, directed toward a top portion 142 of the housing infrastructure 108. The image capture device 140 generates digital imagery of the environment of the robot 100 as the robot 100 moves about the floor surface 10. The image capture device 140 is angled in an upward direction, e.g., angled between 30 degrees and 80 degrees from the floor surface 10 about which the robot 100 navigates. The camera, when angled upward, is able to capture images of wall surfaces of the environment so that features corresponding to objects on the wall surfaces can be used for localization.

When the controller 109 causes the robot 100 to perform the mission, the controller 109 operates the motors 114 to drive the drive wheels 112 and propel the robot 100 along the floor surface 10. In addition, the controller 109 operates the motor 120 to cause the rotatable members 118 to rotate, operates the motor 128 to cause the brush 126 to rotate, and operates the motor of the vacuum assembly 119 to generate the airflow. To cause the robot 100 to perform various navigational and cleaning behaviors, the controller 109 executes software stored on the memory storage element 144 to cause the robot 100 to perform by operating the various motors of the robot 100. The controller 109 operates the various motors of the robot 100 to cause the robot 100 to perform the behaviors.

The sensor system can further include sensors for tracking a distance travelled by the robot 100. For example, the sensor system can include encoders associated with the motors 114 for the drive wheels 112, and these encoders can track a distance that the robot 100 has travelled. In some implementations, the sensor system includes an optical sensor facing downward toward a floor surface. The optical sensor can be an optical mouse sensor. For example, the optical sensor can be positioned to direct light through a bottom surface of the robot 100 toward the floor surface 10. The optical sensor can detect reflections of the light and can detect a distance travelled by the robot 100 based on changes in floor features as the robot 100 travels along the floor surface 10.

The controller 109 uses data collected by the sensors of the sensor system to control navigational behaviors of the robot 100 during the mission. For example, the controller 109 uses the sensor data collected by obstacle detection sensors of the robot 100, e.g., the cliff sensors 134, the proximity sensors 136a, 136b, 136c, and the bump sensors 139a, 139b, to enable the robot 100 to avoid obstacles within the environment of the robot 100 during the mission.

The sensor data can be used by the controller 109 for simultaneous localization and mapping (SLAM) techniques in which the controller 109 extracts features of the environment represented by the sensor data and constructs a map of the floor surface 10 of the environment. The sensor data collected by the image capture device 140 can be used for techniques such as vision-based SLAM (VSLAM) in which the controller 109 extracts visual features corresponding to objects in the environment and constructs the map using these visual features. As the controller 109 directs the robot 100 about the floor surface 10 during the mission, the controller 109 uses SLAM techniques to determine a location of the robot 100 within the map by detecting features represented in collected sensor data and comparing the features to previously stored features. The map formed from the sensor data can indicate locations of traversable and nontraversable space within the environment. For example, locations of obstacles are indicated on the map as traversable space, and locations of open floor space are indicated on the map as nontraversable space.

The sensor data collected by any of the sensors can be stored in the memory storage element 144. In addition, other data generated for the SLAM techniques, including mapping data forming the map, can be stored in the memory storage element 144. These data produced during the mission can include persistent data that are produced during the mission and that are usable during another mission. For example, the other mission is a subsequent mission occurring after the mission. In addition to storing the software for causing the robot 100 to perform its behaviors, the memory storage element 144 stores sensor data or data resulting from processing of the sensor data for access by the controller 109 from one mission to another mission. For example, the map is a persistent map that is usable and updateable by the controller 109 of the robot 100 from one mission to another mission to navigate the robot 100 about the floor surface 10.

The persistent data, including the persistent map, enables the robot 100 to efficiently clean the floor surface 10. For example, the persistent map enables the controller 109 to direct the robot 100 toward open floor space and to avoid nontraversable space. In addition, for subsequent missions, the controller 109 is able to plan navigation of the robot 100 through the environment using the persistent map to optimize paths taken during the missions.

Example Processes

The robot 100 can perform certain processes for navigating about an environment and traversing a floor surface in the environment. FIGS. 4, 6, 8, and 10 are flowcharts illustrating some of these processes. Operations of these processes can be performed by the robot 100, the controller 109, other subsystems of the robot 100, and/or processors and servers remote from the robot 100. For example, to perform operations in which the robot 100 moves about the floor surface, the controller 109 can operate the drive system 110 of the robot 100. The controller 109 can also operate the sensor system to collect data, e.g., data indicative of objects in the environment of the robot 100. The controller 109 can operate other subsystems of the robot 100 as well.

Figure 4:
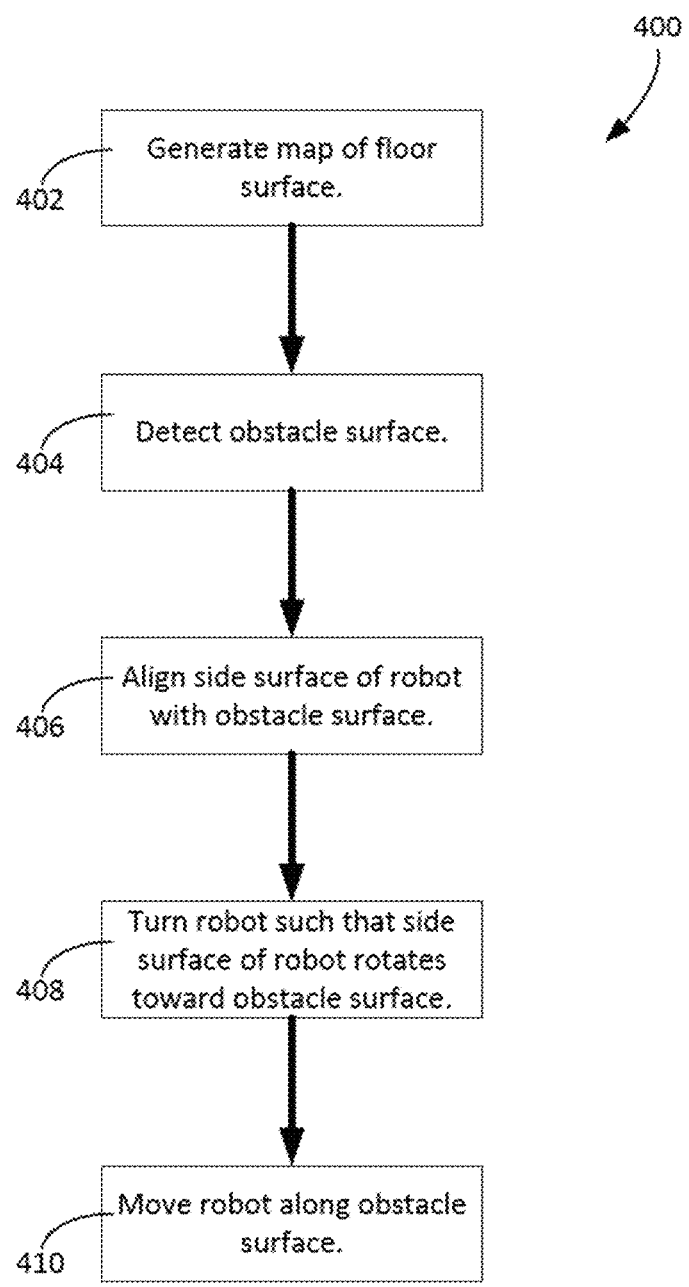
FIGS. 4, 6, 8, 10, and 12 are flowcharts for example processes for navigating an autonomous mobile robot.

FIG. 4 shows a flowchart illustrating a process 400 for navigating a robot to follow an obstacle surface. FIGS. 5A-5E show diagrams of the robot 100 performing operations of the process 400 to follow an obstacle surface 500. In the example shown in FIG. 4, the process 400 includes operations 402, 404, 406, 408, 410. During the process 400, the robot 100 performs an obstacle following behavior in which the robot 100 travels along the obstacle surface 500 to clean a portion of the floor surface 10 adjacent to the obstacle surface 500.

Figure 5:
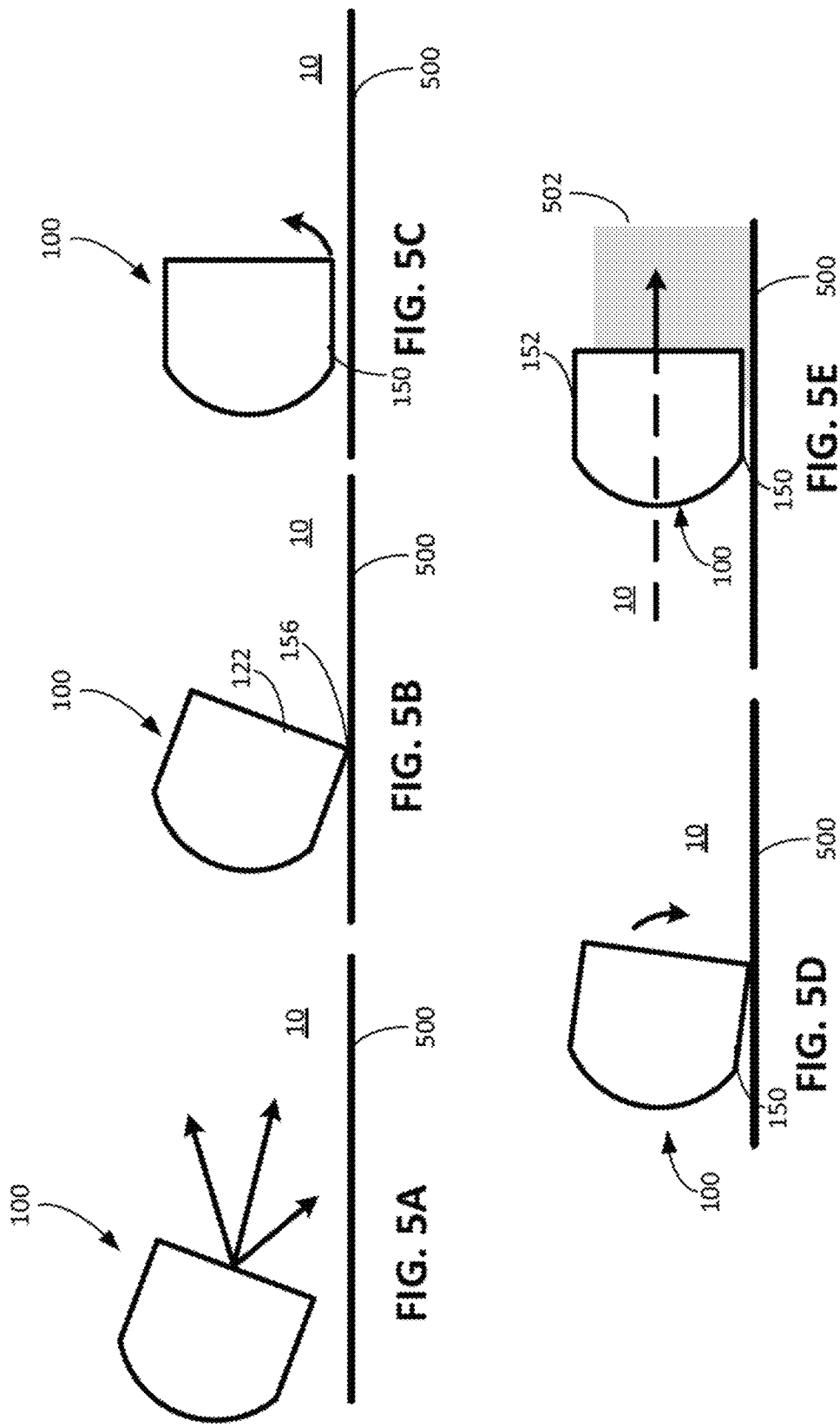

While FIGS. 4 and 5 are described with respect to the side surface 150 travelling along the obstacle surface 500, in other implementations, the robot 100 can be controlled such that the side surface 152 travels along the obstacle surface 500. In some implementations, the robot 100 includes a brush similar to the brush 126 on the left side of the robot 100. This brush can extend forward of the forward surface 154 and leftward of the side surface 152, thus enabling the robot 100 to clean a portion of the floor surface to the left of the side surface 152.

At the operation 402, a map of the floor surface 10 (shown in FIG. 5A) is generated. As shown in FIG. 5A, during the operation 402, the robot 100 may be positioned away from the obstacle surface 500. The map of the floor surface 10 can indicate a location and an orientation of the obstacle surface 500 relative to the robot 100. Based on the location and the orientation of the obstacle surface 500, e.g., determined by data collected from the sensor system of the robot 100, the controller 109 (shown in FIG. 3A) can select a direction to navigate the robot 100 toward the obstacle surface 500. The controller 109 can then operate the drive system 110 (shown in FIG. 3A) of the robot 100 to move the robot 100 in the forward drive direction F (shown in FIG. 3A) toward the obstacle surface 500.

At the operation 404, as shown in FIG. 5B, the obstacle surface 500 is detected. For example, the sensor system of the robot 100 can detect the obstacle surface 500. In some implementations, the robot 100 detects the obstacle surface 500 using one or more of the bump sensors 139a, 139b. The bump sensors 139a, 139b can be triggered in response to the robot 100 contacting the obstacle surface 500, thereby allowing the controller 109 to detect the presence of the obstacle surface 500. As shown in FIG. 5B, the forward portion 122 of the robot 100, e.g., the corner surface 156 of the forward portion 122, contacts the obstacle surface 500.

In some implementations, the robot 100 detects the obstacle surface 500 using one or more of the proximity sensors 136a, 136b, 136c. The proximity sensors 136a, 136b, 136c can detect reflections of optical emissions from the proximity sensors 136a, 136b, 136c when the obstacle surface 500 is near the robot 100. The controller 109, in response to the proximity sensors 136a, 136b, 136c detecting these reflections, can determine that the obstacle surface 500 is nearby. In some implementations, the controller 109 determines that the obstacle surface 500 is nearby only when the obstacle surface 500 is within a certain distance from the robot 100, e.g., within 0.5 centimeters to 5 centimeters. In some implementations, in response to determining that that the obstacle surface 500 is nearby, the controller 109 operates the drive system 110 of the robot 100 to slow down the robot 100 as the robot 100 moves closer to the obstacle surface 500.

At the operation 406, as shown in FIG. 5C, the side surface 150 of the robot 100 is aligned with the obstacle surface 500. For example, the side surface 150 can be oriented to be substantially parallel with the obstacle surface 500. An angle between the side surface 150 and the obstacle surface 500 can be less than 5 degrees, e.g., less than 4 degrees, less than 3 degrees, less than 2 degrees, less than 1 degree, or less than 0.5 degrees.

At the operation 406, in addition to aligning the side surface 150 of the robot 100 with the obstacle surface 500, the controller 109 can position the side surface 150 within a certain distance from the obstacle surface 500. For example, this certain distance can be less than 0.1 centimeters and 1 centimeter, e.g., at most 0.1 centimeters, at most 0.2 centimeters, at most 0.3 centimeters, at most 0.4 centimeters, or at most 0.5 centimeters. The certain distance can be sufficiently small to ensure that the brush 126 (shown in FIG. 3A) can contact the obstacle surface 500. For example, the certain distance can be less than the distance D1 (shown in FIG. 3A). The side surface 150 of the robot 100 can be positioned sufficiently close to the obstacle surface 500 such that the cleaning region 176 (shown in FIG. 3C) covers a portion of the floor surface 10 between the side surface 150 and the obstacle surface 500. In some implementations, the brush 126 (shown in FIG. 3A) contacts the obstacle surface 500. This can enable the robot 100 to clean an interface between the floor surface 10 and the obstacle surface 500. To align the side surface 150 of the robot 100 with the obstacle surface 500 and to ensure the side surface 150 is sufficiently close to the obstacle surface 500 while the side surface 150 is aligned with the obstacle surface 500, the controller 109 can operate the drive system 110 to turn the robot 100 and move the robot 100 toward the obstacle surface 500.

At the operation 408, as shown in FIG. 5D, the robot 100 is turned such that the side surface 150 rotates toward the obstacle surface 500. The robot 100 is turned in this manner to determine whether the robot 100 is sufficiently close to the obstacle surface 500, e.g., within the certain distance described with respect to the operation 406. In particular, the robot 100 is turned in order to ensure that the side surface 150, prior to turning and while the robot 100 is aligned with the obstacle surface 500 in the manner described with respect to the operation 406, is within the certain distance from the obstacle surface 500. The controller 109 can determine whether the robot 100 is within this certain distance by, for example, measuring an amount that the robot 100 rotates in order to contact the obstacle surface 500. If the robot 100 is not within the certain distance, the controller 109 can operate the drive system 110 to turn the robot 100 and move the robot 100 toward the obstacle surface 500 to align the side surface 150 with the obstacle surface 500 and to ensure that the side surface 150 is sufficiently close to the obstacle surface 500 while the side surface 150 is aligned with the obstacle surface 500.

The robot 100 can be rotated until a certain condition is satisfied. In some implementations, the condition corresponds to when one of the bump sensors 139a, 139b is triggered, e.g., when the robot 100 contacts the obstacle surface 500. Alternatively or additionally, the conditions corresponds to when torques of the motors 114 spike. In response to the condition being satisfied, a value of a signal generated by the obstacle following sensor 141 is measured. The value can be inversely proportional to a distance between the obstacle following sensor 141 and the obstacle surface 500 and is maximized when the side surface 150 or the corner surface 156 contacts the obstacle surface 500. The maximum value detected at this operation can be used to calibrate the obstacle following sensor 141, which may in some cases produce signals of varying values depending on light conditions in the environment and properties of the obstacle surface (e.g., color, roughness, material type, etc.).

In some implementations in which the obstacle following sensor 141 includes an optical sensor, the value is proportional to an intensity of the reflection of the optical beam detected by the obstacle following sensor 141. In some implementations, a value of a signal generated by the obstacle following sensor 141 before the robot 100 starts turning at the operation 408 can be compared to the maximum value of the signal generated by the obstacle following sensor 141 during the operation 408 to determine whether the robot 100 is within the certain distance.

At the operation 410, as shown in FIG. 5E, the robot 100 is moved along the obstacle surface 500. The cleaning regions 174, 176 (shown in FIG. 3C) traverse along a cleaning path 502 that extends from the interface between the obstacle surface 500 and the floor surface 10 toward the side surface 152 of the robot 100. As a result, the robot 100 can clean a portion of the floor surface 10 adjacent the obstacle surface 500. As the robot 100 is moved in the forward drive direction F, the controller 109 can operate the drive system 110 to adjust an orientation of the robot 100 based on one or more signals received from the obstacle following sensor 141. The orientation can be adjusted such that the side surface 150 is aligned with the obstacle surface 500 as the robot 100 moves along with the obstacle surface 150. For example, the orientation can be adjusted such that one or more values of the one or more signals can be maintained within a certain range.

Figure 6:
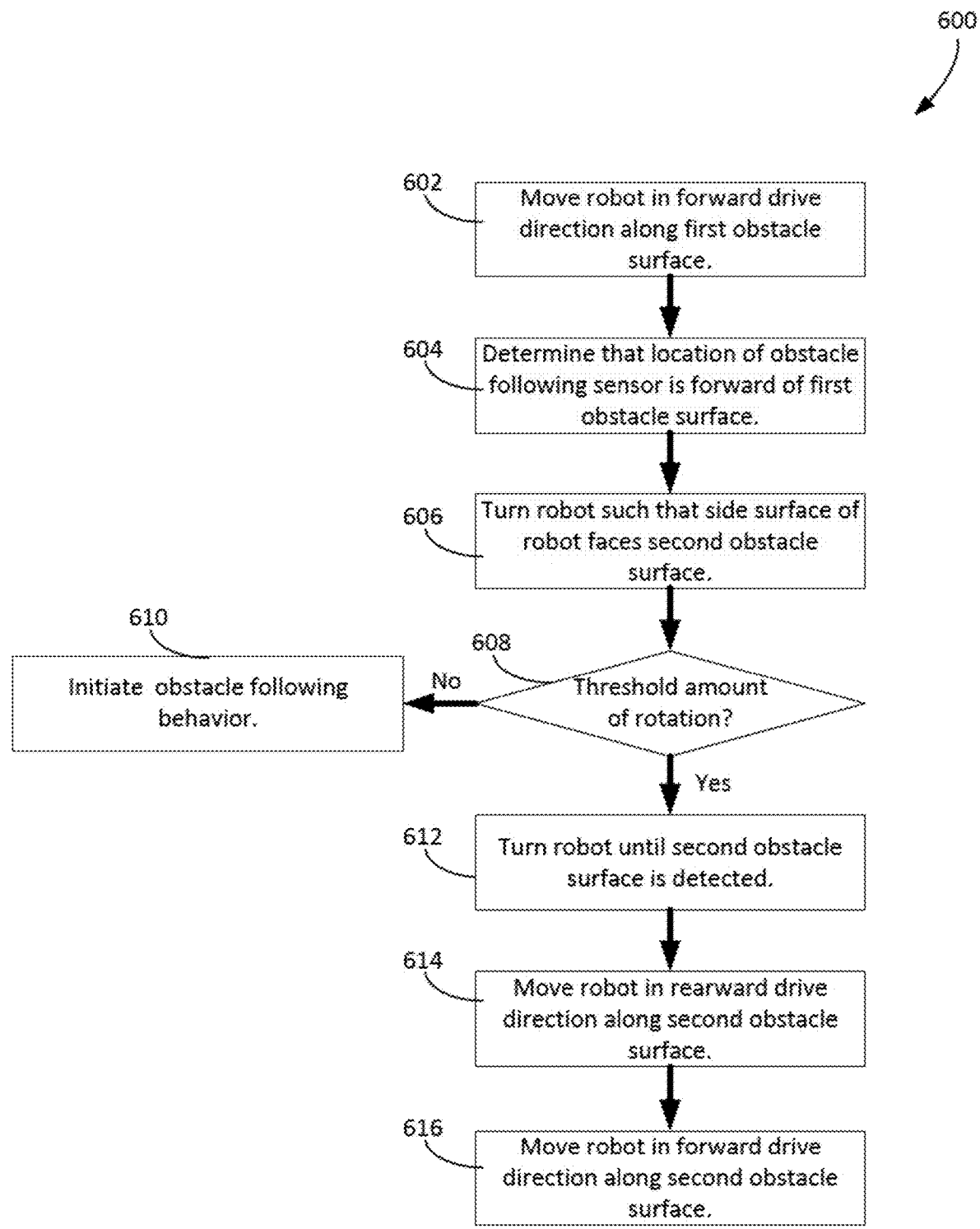

FIG. 6 shows a flowchart illustrating a process 600 for navigating a robot to follow an obstacle surface. FIGS. 7A-7F show diagrams of the robot 100 performing operations of the process 600 to follow a first obstacle surface 700 and a second obstacle surface 702 angled relative to the first obstacle surface 700. The first obstacle surface 700 and the second obstacle surface 702 can be adjacent surfaces. The first obstacle surface 700 and the second obstacle surface 702 can be non-parallel surfaces and can form an outside corner. In the example shown in FIG. 6, the process 600 includes operations 602, 604, 606, 608, 610, 612, 614, 616. During the process 600, the robot 100 performs an obstacle following behavior in which the robot 100 travels along the first obstacle surface 700 and the second obstacle surface 702 to clean a portion of the floor surface 10 adjacent to the first obstacle surface 700 and the second obstacle surface 702. While FIGS. 6 and 7A-7F are described with respect to the side surface 152 travelling along the first obstacle surface 700 and the second obstacle surface 702, in other implementations, the robot 100 can be controlled such that the side surface 150 travels along the first obstacle surface 700 and the second obstacle surface 702.

Figure 7A:
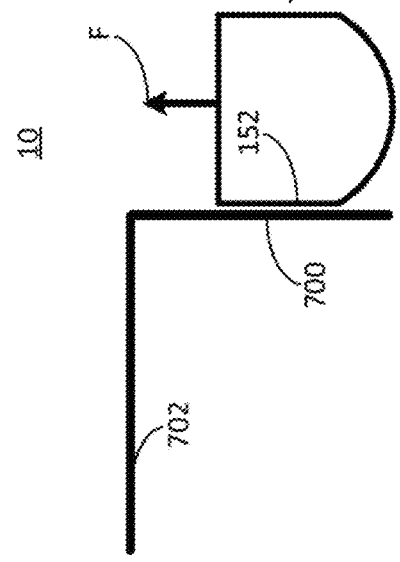

At the operation 602, as shown in FIG. 7A, the robot 100 is moved in the forward drive direction F along the first obstacle surface 700. The robot 100 can be controlled in a manner similar to that described with respect to the operation 410. In particular, the controller 109 can operate the drive system 110 to move the robot 100 in the forward drive direction F along the first obstacle surface 700 with the side surface 152 of the robot 100 facing the first obstacle surface 700.

Figure 7B:
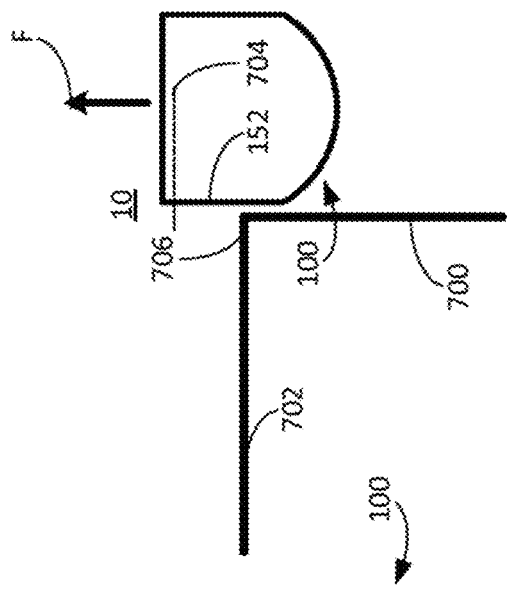

At the operation 604, as shown in FIG. 7B, a location of the obstacle following sensor (along the side surface 152 of the robot 100 as described herein) is positioned forward of the first obstacle surface 700. The controller 109 can determining, using the obstacle following sensor, that the location of the obstacle following sensor is positioned forward of the first obstacle surface 700. For example, the obstacle following sensor is located along the side surface 152 of the robot 100 and is located along a horizontal axis 704 perpendicular to the side surface 152 and perpendicular to the forward drive direction F. The horizontal axis 704 is positioned in the forward drive direction F relative to the first obstacle surface 700 and relative to an interface 706 between the first obstacle surface 700 and the second obstacle surface 702. The obstacle following sensor can detect that its location is forward of the first obstacle surface 700. For example, if the obstacle following sensor is an optical sensor, a value of a signal produced by the obstacle following sensor can decrease in response to the emitted optical beam being no longer able to contact the first obstacle surface 700. As a result, a reflection of the optical beam emitted by the obstacle following sensor is undetectable by the obstacle following sensor when the location of the obstacle following sensor is forward of the first obstacle surface 700.

In some implementations, the robot 100 continues to be navigated forward of the first obstacle surface 700 at the operation 604 until the location of the obstacle following sensor is at least a certain distance beyond the first obstacle surface 700 in the forward drive direction F. In this regard, the robot 100 can continue moving in the forward drive direction F until the robot 100 moves a distance of at least 1 to 60 centimeters, e.g., at least 1 centimeter, at least 2 centimeters, at least 3 centimeters, at least 4 centimeters, at least 5 centimeters, at least 10 centimeters, at least 15 centimeters, at least 30 centimeters, at least 45 centimeters, or at least 60 centimeters. In some implementations, this distance corresponds to 25% to 200% of the length L1 of the robot 100. The controller 109 can track the distance travelled using the sensor system as described herein, e.g., using encoders of the robot 100 or using an optical mouse sensor of the robot 100. In some implementations, the robot 100 continues to be navigated forward of the first obstacle surface 700 at the operation 604 until the center of rotation 164 (shown in FIG. 3C) of the robot 100 is forward of the first obstacle surface 700. For example, at this point, a horizontal axis perpendicular to the forward drive direction F and passing through the center of rotation 164 can be aligned with or forward of the second obstacle surface 702. Alternatively or additionally, this horizontal axis can be forward of the first obstacle surface 700. Upon the horizontal axis aligning with the second obstacle surface 702, the robot 100 can continue moving in the forward drive direction F by a distance of at least 1 to 60 centimeters, e.g., at least 1 centimeter, at least 2 centimeters, at least 3 centimeters, at least 4 centimeters, at least 5 centimeters, at least 10 centimeters, at least 15 centimeters, at least 30 centimeters, at least 45 centimeters, or at least 60 centimeters. In some implementations, this distance corresponds to 25% to 200% of the length L1 of the robot 100.

Figure 7C:
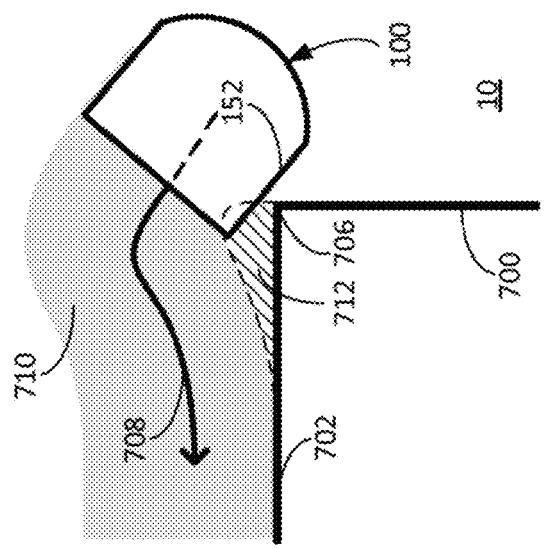

At the operation 606, as shown in FIG. 7C, the robot 100 is turned such that the side surface 152 faces the second obstacle surface 702. The robot 100 can be turned in response to the location of the obstacle following sensor being forward of the first obstacle surface 700, e.g., in response to detecting that the location is forward of the first obstacle surface 700. For example, the operation 606 can be triggered in response to the obstacle following sensor being forward of the first obstacle surface 700 by the certain distance as described with respect to the operation 604.

The controller 109 can turn the robot 100 and move the robot 100 in the forward drive direction F to move the robot 100 along a trajectory 708 toward the second obstacle surface 702. As shown in FIG. 7C, the trajectory 708 includes an arcuate portion that allows the robot 100 to be reoriented to align the side surface 152 with the second obstacle surface 702. In some cases, during the operation 606, the robot 100 is turned in place for at least a portion of the operation 606 to realign the side surface 152 with the second obstacle surface 702. In some implementations, to align the side surface 152 with the second obstacle surface 702, operations similar to the operations 402, 404, 406, 408, 410 can be performed.

As the robot 100 moves along the trajectory 708, in some implementations, a cleaning path 710 of the robot 100 does not pass through a portion 712 of the floor surface 10. The cleaning path 710 can correspond to a portion of the floor surface 10 through which the cleaning regions 174, 176 (shown in FIG. 3C) traverse as the robot 100 moves along the trajectory 708. The portion 712 of the floor surface 10 thus does not get cleaned by the brush 126 or the cleaning assembly 116. The portion 712 of the floor surface 10 can extend from the interface 706 or from proximate the interface 706 away from the first obstacle surface 700 along the second obstacle surface 702. The portion 712 can be substantially triangularly shaped. A length of the portion 712 along the second obstacle surface 702 can be at least 1 to 15 centimeters, e.g., between 5 and 10 centimeters, at least 1 centimeter, at least 3 centimeters, at least 5 centimeters, at least 8 centimeters, at least 10 centimeters, at least 13 centimeters, or at least 15 centimeters. The length of the portion 712 along the second obstacle surface 702 can be between 5% to 50% of the length L1 of the robot 100, e.g., between 5% and 25%, 10% and 30%, 15% and 35%, 20% and 40%, 25% and 45%, or 30% and 50% of the length L1 of the robot 100.

In some implementations, the robot 100 includes a brush similar to the brush 126 on the left side of the robot 100. The portion 712 can extend from proximate the interface 706 but contacts the interface 706, as the region 176 covered by the brush can traverse a portion of the floor surface 10 that is positioned along the second obstacle surface 702 and that contacts the interface 706.

At the operation 608, the robot 100 determines whether the robot 100 has turned at least a threshold amount of rotation at the operation 606 before detecting the second obstacle surface 702. For example, the threshold amount of rotation can be a value between 25 and 65 degrees, e.g., between 25 and 55 degrees, 30 and 60 degrees, 35 and 65 degrees, or about 25, 30, 35, 40, 45, 50, 55, 60, or 65 degrees. The robot 100 can detect the second obstacle surface 702 upon one or more conditions being satisfied. In some implementations, the robot 100 detects the second obstacle surface 702 by contacting the second obstacle surface 702 and triggering one or more of the bump sensors 139a, 139b (shown in FIG. 3B) of the robot 100. In some implementations, the robot 100 detects the second obstacle surface 702 be being sufficiently close to the second obstacle surface 702 such that the obstacle following sensor detects the second obstacle surface 702. In some implementations, both a bump sensor and an obstacle following sensor are triggered for detecting the second obstacle surface 702 at the operation 608.

If the robot 100 determines that the robot 100 has turned less than the threshold amount of rotation upon detecting the second obstacle surface 702, an obstacle following behavior is initiated. In particular, the robot 100 is moved to follow the second obstacle surface 702 in a manner similar to that described with respect to the operations 402, 404, 406, 408, 410.

Figure 7D:
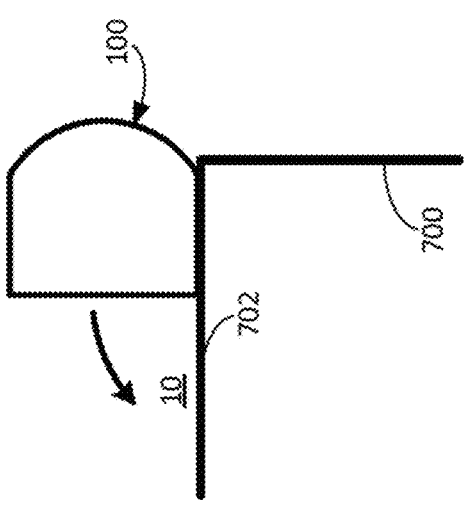

If the robot 100 determines that the robot 100 has turned no less than the threshold amount of rotation at the operation 606, at the operation 612, as shown in FIG. 7D, the robot 100 is turned until the second obstacle surface 702 is detected. The robot 100 can be turned in place about its center of rotation 164 (shown in FIG. 3C) such that the forward portion 122 (shown in FIG. 3A) rotates toward the second obstacle surface 702. For detecting the second obstacle surface 702, the operation 612 can be similar to the operation 404. The robot 100 can detect the second obstacle surface 702 upon one or more conditions being satisfied. In some implementations, the robot 100 detects the second obstacle surface 702 by contacting the second obstacle surface 702 and triggering one or more of the bump sensors 139a, 139b (shown in FIG. 3B) of the robot 100. In some implementations, the robot 100 detects the second obstacle surface 702 be being sufficiently close to the second obstacle surface 702 such that the obstacle following sensor detects the second obstacle surface 702. In some implementations, both a bump sensor and an obstacle following sensor are triggered for detecting the second obstacle surface 702 at the operation 612.

In some implementations, the obstacle following sensor can be calibrated during this operation. The obstacle following sensor can be calibrated in the manner described with respect to the operation 408.

Figure 7E:
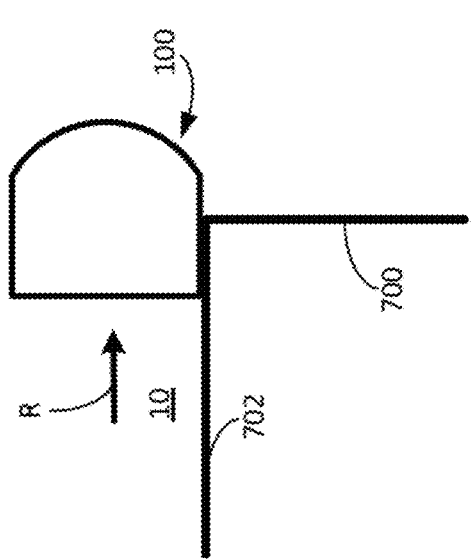

At the operation 614, as shown in FIG. 7E, the robot 100 is moved in the rearward drive direction R along the second obstacle surface 702. As the robot 100 is moved in the rearward drive direction R, the controller 109 can operate the drive system 110 to adjust an orientation of the robot 100. Through a process similar to that described with respect to the operation 410, the orientation can be adjusted such that the side surface 152 is aligned with the second obstacle surface 702 as the robot 100 moves along with the second obstacle surface 702.

At the operation 614, the controller 109 can operate the drive system 110 to move the robot 100 and its cleaning path through the portion 712 of the floor surface 10, e.g., at least part of the portion 712 of the floor surface. In some implementations, the cleaning path of the robot 100 as the robot 100 moves in the rearward drive direction R only covers part of the portion 712 of the floor surface 10 because a portion adjacent the second obstacle surface 702 does not get traversed by the cleaning region 174. In some implementations, the robot 100 includes a brush similar to the brush 126 on the left side of the robot 100 and a cleaning region for this brush traverses a portion of the floor surface 10 adjacent the second obstacle surface 702.

In some implementations, the robot 100 continues to be navigated rearward of the second obstacle surface 702 at the operation 614 until the location of the obstacle following sensor is at a certain distance beyond the second obstacle surface 700 in the rearward drive direction R. The robot 100 can determine that the location of the obstacle following sensor is beyond, e.g., rearward of, the second obstacle surface 700 in a manner similar to that described with respect to the operation 604. The robot 100 can continue moving in the rearward drive direction R until the robot 100 moves a distance of at least 1 to 60 centimeters, e.g., at least 1 centimeter, at least 2 centimeters, at least 3 centimeters, at least 4 centimeters, at least 5 centimeters, at least 10 centimeters, at least 15 centimeters, at least 30 centimeters, at least 45 centimeters, or at least 60 centimeters. In some implementations, this distance corresponds to 25% to 200% of the length L1 of the robot 100. The controller 109 can track the distance travelled using the sensor system as described herein, e.g., using encoders of the robot 100 or using an optical mouse sensor of the robot 100.

Figure 7F:
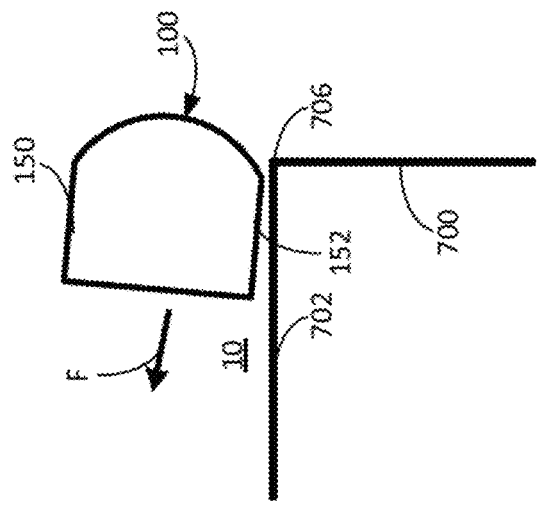

At the operation 616, as shown in FIG. 7F, the robot 100 is moved in the forward drive direction F along the second obstacle surface 702. The robot 100 can be moved in the forward drive direction F in response to the robot determining that the location of the obstacle following sensor is beyond or rearward of the second obstacle surface 700, e.g., by a certain distance.

In some implementations, at the operation 616, the drive system 110 is also operated to move the robot 100 away from the second obstacle surface 702 during some portion of the operation 616. In particular, the robot 100 is controlled to maneuver toward the second obstacle surface 702 at an approach that is angled relative to the second obstacle surface 702. For example, the robot 100 can be turned away from the second obstacle surface 702 such that the forward drive direction F of the robot 100 is angled relative to the second obstacle surface 702. In this regard, the robot 100 moves away from the second obstacle surface 702 as the robot 100 moves in the forward drive direction F. For example, the side surface 152 of the robot moves away from the second obstacle surface 702 as the robot 100 moves in the forward drive direction F along the second obstacle surface 702. A distance between the second obstacle surface 702 and the side surface 152 along an axis perpendicular to the second obstacle surface 702 can increase as the robot 100 moves in the forward drive direction F. The forward drive direction F and the second obstacle surface 702 can form a nonparallel and non-zero angle, for example, between 1 and 10 degrees, e.g., between 1 and 3 degrees, between 2 and 4 degrees, or between 5 and 10 degrees. In some implementations, the robot 100 is turned in place such that the forward portion 122 (shown in FIG. 3A) is turned away from the second obstacle surface 702. This angled approach toward the second obstacle surface 702 can reduce the likelihood that the robot 100 contacts the interface 706 between the first obstacle surface 700 and the second obstacle surface 702.

At the operation 616, the robot 100 can be moved in the forward drive direction F until one or more conditions are satisfied. In some implementations, the robot 100 can move in the forward drive direction F until the second obstacle surface 702 is detected, e.g., by the obstacle following sensor on the left side of the robot 100. In some implementations, the robot 100 can move in the forward drive direction F until the robot 100 determines it has travelled a certain distance. This certain distance can be, for example 50% to 150% of the length L1 of the robot 100, e.g., 50% to 100%, 75% to 125%, 100% or 150%, or about 50%, 75%, 100%, 125%, or 150% of the length L1 of the robot 100. In some implementations, the robot 100 can move in the forward drive direction until the first of the second obstacle surface 702 being detected or the robot 100 travelling the certain distance occurs. In some implementations, both of these conditions occur before the robot 100 stops moving the in the forward drive direction F at the operation 616.

After the one or more conditions are satisfied, the robot 100 performs an obstacle following behavior similar to that described for the process 400 and its operations 402, 404, 406, 408, 410. The robot 100 is controlled to realign with the second obstacle surface 702 such that the robot 100 is no longer travelling along the second obstacle surface 702 with the angle described with respect to the operation 616. Rather, the forward drive direction F is substantially parallel with the second obstacle surface 702, e.g., having an angle less than 5 degrees, e.g., less than 4 degrees, less than 3 degrees, less than 2 degrees, less than 1 degree, or less than 0.5 degrees. In the example shown in FIG. 7F, the robot 100 moves along the second obstacle surface 702 with the side surface 152 facing the second obstacle surface 702.

Figure 8:
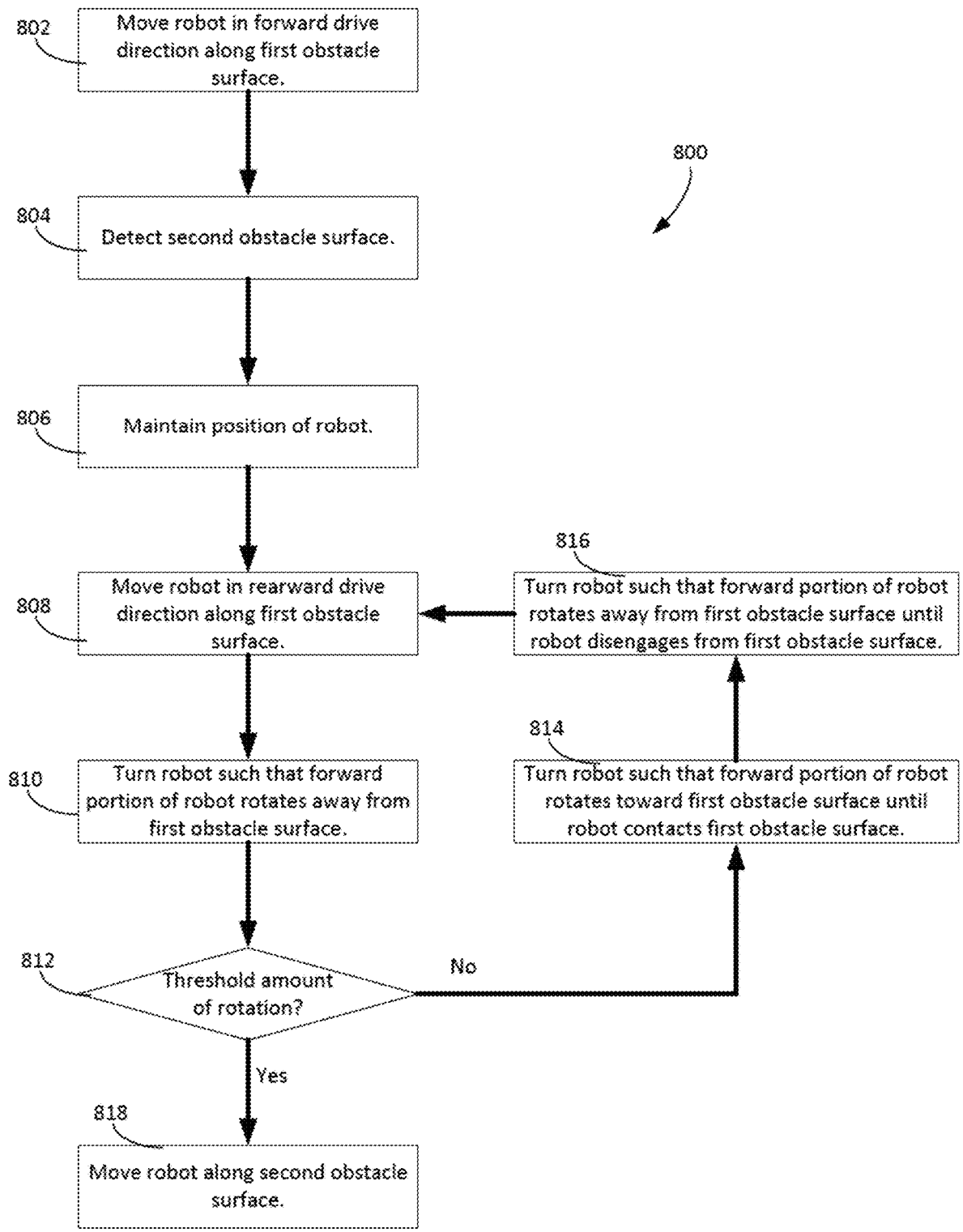

FIG. 8 shows a flowchart illustrating a process 800 for navigating a robot to follow an obstacle surface. FIGS. 9A-9H show diagrams of the robot 100 performing operations of the process 800 to follow a first obstacle surface 900 and a second obstacle surface 902 angled relative to the first obstacle surface 900. The first obstacle surface 900 and the second obstacle surface 902 can be adjacent surfaces. The first obstacle surface 900 and the second obstacle surface 902 can be non-parallel surfaces and can form an inside corner. In the example shown in FIG. 8, the process 800 includes operations 802, 804, 806, 808, 810, 812, 814, 816, 818. During the process 800, the robot 100 performs an obstacle following behavior in which the robot 100 travels along the first obstacle surface 900 and the second obstacle surface 902 to clean a portion of the floor surface 10 adjacent to the first obstacle surface 900 and the second obstacle surface 902. While FIGS. 8 and 9A-9H are described with respect to the side surface 150 travelling along the first obstacle surface 900 and the second obstacle surface 902, in other implementations, the robot 100 can be controlled such that the side surface 152 travels along the first obstacle surface 900 and the second obstacle surface 902.

Figure 9A:
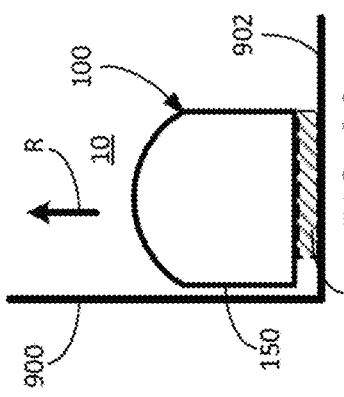

At the operation 802, as shown in FIG. 9A, the robot 100 is moved in the forward drive direction F along the first obstacle surface 900. The robot 100 can be controlled in a manner similar to that described with respect to the operation 602. In particular, the controller 109 can operate the drive system 110 to move the robot 100 in the forward drive direction F along the first obstacle surface 900 with the side surface 150 of the robot 100 facing the first obstacle surface 900.

Figure 9B:
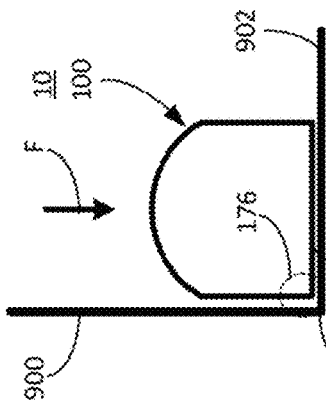

The robot 100 is moved in the forward drive direction F during the operation 802 until the second obstacle surface 902 is detected. At the operation 804, the second obstacle surface 902 is detected. As shown in FIG. 9B, in some implementations, the robot 100 can detect the second obstacle surface 902 using one or more of the bump sensors 139*a*, 139*b* (shown in FIG. 3B) of the robot 100 and/or using one or more of the proximity sensors 136*a*, 136*b*, 136*c* (shown in FIG. 3B) of the robot 100. For example, the bump sensors 139*a*, 139*b* can be triggered in response to contact between the forward surface 154 of the robot 100 and the second obstacle surface 902. Alternatively or additionally, the proximity sensors 136*a*, 136*b*, 136*c* can be triggered in response to the robot 100 being sufficiently close to the second obstacle surface 902. In some implementations, the controller 109 determines that the second obstacle surface 902 is sufficiently close only when the second obstacle surface 902 is within a certain distance from the robot 100, e.g., within 0.5 centimeters to 5 centimeters.

At the operation 806, a position of the robot 100 is maintained. This position can correspond to a position at which point the robot 100 detects the second obstacle surface 902. In this regard, the robot 100 is positioned to be proximate the second obstacle surface 902 or contacting the second obstacle surface 902, e.g., contacting the second obstacle surface 902 with the forward surface 154. In some cases, the bumper 138 (shown in FIG. 3A) can be compressed a small amount during the operation 806, e.g., by about 1 to 5 millimeters. In some implementations, the robot 100 is driven in the forward drive direction F to maintain the position of the robot 100.

In addition to being positioned proximate to the second obstacle surface 902 or contacting the second obstacle surface 902, the robot 100 is positioned to be proximate the first obstacle surface 900 or to be contacting the first obstacle surface 900, e.g., with the side surface 150. The controller 109 can operate the drive system 110 to maintain the position of the robot 100 for a certain amount of time. This amount of time can be at least 1 to 5 seconds, e.g., at least 1 second, at least 2 seconds, at least 3 seconds, at least 4 seconds, or at least 5 seconds. By maintaining the position of the robot 100, the cleaning region 176 of the brush 126 can clean a portion of the floor surface 10 adjacent to an interface 904 between the first obstacle surface 900 and the second obstacle surface 902. This portion of the surface can extend along both the first obstacle surface 900 and the second obstacle surface 902 and can correspond to a corner portion of the floor surface 10.

As shown in FIG. 8, the operations 808, 810, 812, 814, 816 can be repeatedly performed until the robot 100 has turned a threshold amount as determined at the operation 812. In particular, during the operations 808, 810, 814, 816, the robot 100 performs a series of movements. The series of movements of the robot 100 during the operations 808, 810, 814, 816 enables the robot 100 to clean along the second obstacle surface 902. In some implementations, the operations 808, 810, 812 814, 816 are repeatedly performed at least two to five times, e.g., at least twice, three times, four times, or five times.

At the operation 808, as shown in FIG. 9C, the robot 100 is moved in the rearward drive direction R along the first obstacle surface 900. The repeated series of movements can thus include this movement in the rearward drive direction. The controller 109 can ensure that the side surface 150 is aligned with the first obstacle surface 900 as the robot 100 moves in the rearward drive direction R by using the obstacle following sensor 141 (shown in FIG. 3B). The orientation of the robot 100 can be adjusted using the obstacle following sensor 141 and using a process similar to that described with respect to the operation 410. In the example shown in FIG. 9C, the robot 100 is moved a certain distance in the rearward drive direction R. This distance can be between 2 and 15 centimeters, e.g., between 2 and 6 centimeters, 4 and 8 centimeters, 6 and 10 centimeters, 10 and 14 centimeters, or about 5, 7, 9, 11, or 13 centimeters. In some implementations, the certain distance is between 10% and 50% of the length L1 of the robot 100.

As shown in FIG. 9C, during the operations 802, 804, 806, and 808, the cleaning regions 174, 176 of the robot 100 do not traverse a portion 906 of the floor surface 10 adjacent to the second obstacle surface 902. For example, in some implementations, because the robot 100 does not include any cleaning implements that can clean a region 173 (shown in FIG. 3C) between the cleaning region 174 and the forward surface 154 of the robot 100, the robot 100 is unable to move in the forward drive direction F along the first obstacle surface 900 to cause the cleaning regions 174, 176 of the robot 100 to traverse the portion 906.

Figure 9D:
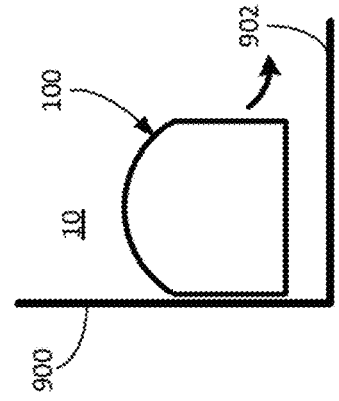

At the operation 810, as shown in FIG. 9D, the robot 100 is turned such that the forward portion 122 (shown in FIG. 3A) is rotated away from the first obstacle surface 900 and toward the second obstacle surface 902. In particular, the corner surface 156 of the robot 100 moves toward the second obstacle surface 902. As a result, the cleaning region 176 is moved toward the second obstacle surface 902 and in some cases contacts the second obstacle surface 902. This enables the cleaning region 176 to traverse through at least part of the untraversed portion 906.

In some implementations, at the operation 810, the robot 100 is turned until the second obstacle surface 902 is detected. For example, the robot 100 can detect the second obstacle surface 902 upon one or more conditions being satisfied. In some implementations, one or more of the bump sensors 139*a*, 139*b* (shown in FIG. 3C) is triggered. For example, the robot 100 can continue to be turned until the forward portion 122 or the corner surface 156 of the robot 100 contacts the second obstacle surface 902. In some implementations, one or more of the proximity sensors 136*a*, 136*b*, 136*c* (shown in FIG. 3A) detects the second obstacle surface 902. In the example shown in FIG. 9D, the proximity sensor 136*a* can detect the second obstacle surface 902 in a manner similar to that described with respect to the operation 608 or the operation 612.

At the operation 812, the robot 100 determines whether it has turned a threshold amount of rotation. For example, the threshold amount of rotation can correspond to when an angle between the forward drive direction F and the first obstacle surface 900 is at least 30 to 60 degrees, e.g., at least 30 degrees, at least 40 degrees, at least 50 degrees, or at least 60 degrees. The robot 100 can determine its angle of rotation using, for example, its encoders, optical mouse sensor, or other parts of its sensor system.

Figure 9E:
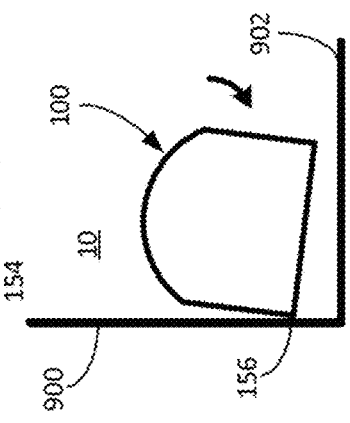

If the robot 100 determines that it has not turned the threshold amount of rotation at the operation 812, at the operation 814, as shown in FIG. 9E, the robot 100 is turned such that the forward portion 122 is rotated toward the first obstacle surface 900. The robot 100 can be turned toward the first obstacle surface 900 until the robot 100 detects the first obstacle surface 900, for example, using one or more of the bumper 138 (shown in FIG. 3B) and the bump sensors 139*a*, 139*b* as described herein. The robot 100 can contact the first obstacle surface 900 with the corner surface 156 of the robot 100.

At the operation 816, as shown in FIG. 9F, the robot 100 is turned such that the forward portion 122 of the robot 100 is rotated away from the first obstacle surface 900. The robot 100 can be turned after the robot 100 is turned toward the first obstacle surface 900 at the operation 814. At the operation 816, this rotation of the forward portion 122 away from the first obstacle surface 900 can disengage the bumper 138 from the first obstacle surface 900.

Figure 9G:
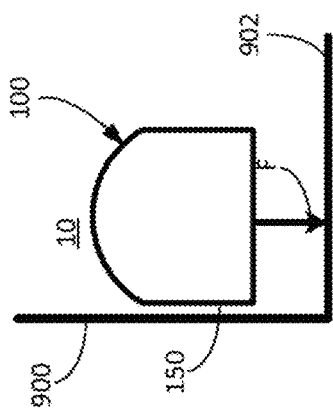

The process 800 can then proceed back to the operation 808, and the robot 100 can be moved the certain distance in the rearward drive direction R as described with respect to the operation 808. The robot 100 can then be turned again, at the operation 810, such that the forward portion 122 is rotated away from the first obstacle surface 900 and toward the second obstacle surface 902. Because the robot 100 has moved further back from the second obstacle surface 902, this rotation enables the cleaning region 176 to traverse a different portion 908 of the untraversed portion 906, as shown in FIG. 9G. This different portion 908 can be further along the second obstacle surface 902, e.g., further away from the interface 904, than a portion 910 traversed during the previous iteration of the operation 810. As the operations 808, 810, 814, 816 are repeated, during each successive repetition, a different portion of the untraversed portion 906 can be traversed by the cleaning region 176.

Figure 9H:
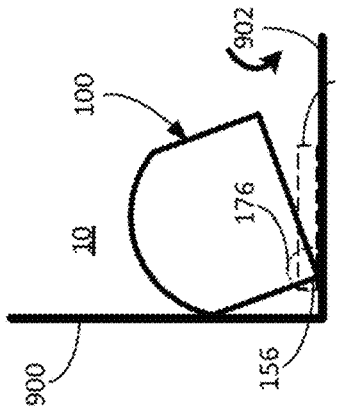

The repetitions of the operations 808, 810, 814, 816 occur until the robot 100 determines that it has turned the threshold amount of rotation at the operation 812. If the robot 100 determines that it has turned the threshold amount of rotation at the operation 812, at the operation 818, as shown in FIG. 9H, the robot 100 is moved along the second obstacle surface 902. The robot 100 can continue to turn beyond the threshold amount of rotation and then can be moved in the forward drive direction F. In particular, the robot 100 is moved such that the forward drive direction F is aligned with the second obstacle surface 902 and the side surface 150 faces the second obstacle surface 902. The robot 100 can move along a trajectory that causes the cleaning region 176 to move through any part of the untraversed portion 906 that was not traversed during the repetitions of the operations 808, 810, 814, 816. This trajectory can include an arcuate trajectory that causes the cleaning region 176 to sweep through the untraversed portion 906. The controller 109 can control movement of the robot 100 during the operation 818 in a manner similar to that described with respect to the operations 402, 404, 406, 408, 410. In this regard, after the side surface 150 is aligned with the second obstacle surface 902, the robot 100 can be moved in the forward drive direction F to move along the second obstacle surface 902 and clean a portion of the floor surface 10 along the second obstacle surface 902.

Figure 10:
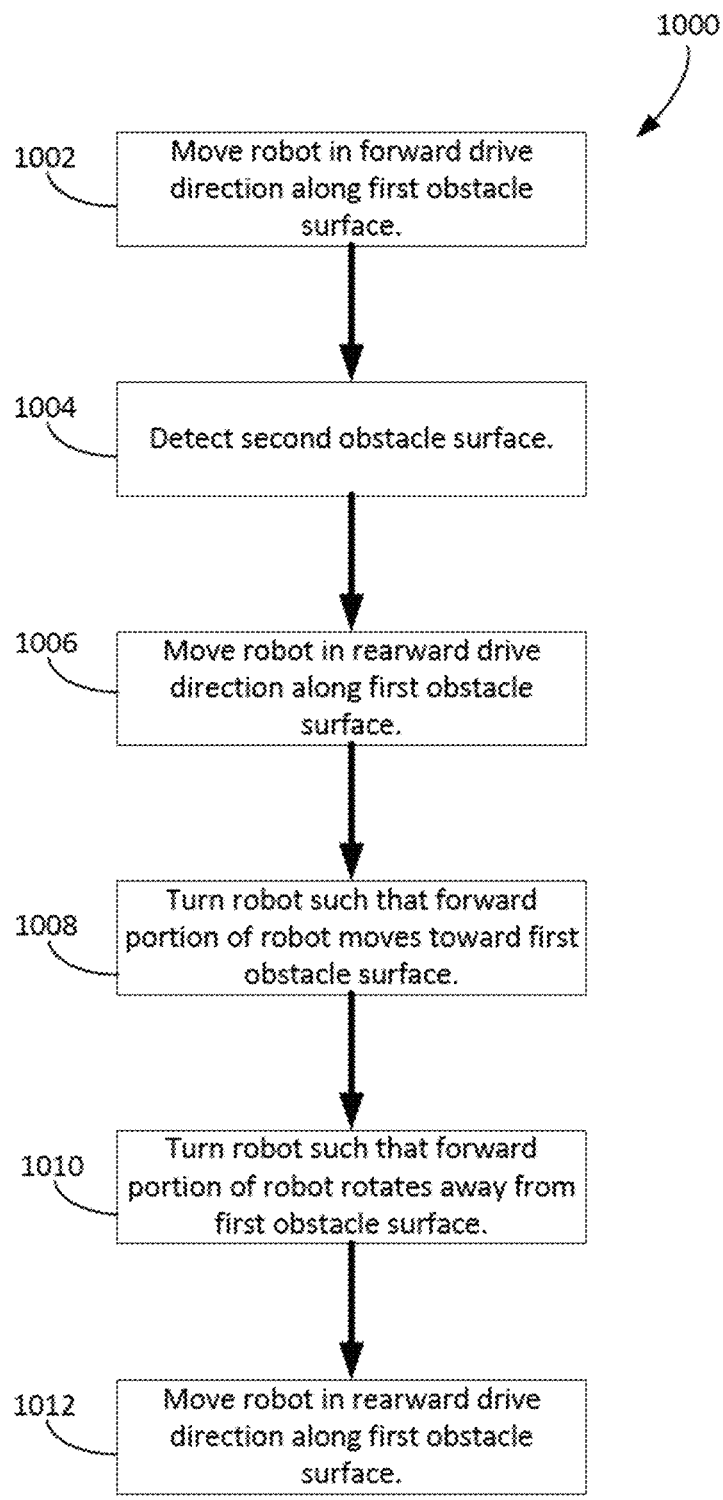

FIG. 10 shows a flowchart illustrating a process 1000 for navigating a robot to follow an obstacle surface and clean an alley 1101 (shown in FIGS. 11A-11F). FIGS. 11A-11F show diagrams of the robot 100 performing operations of the process 1000 to follow a first obstacle surface 1100 positioned a certain distance from a third obstacle surface 1104. A width W2 between the first obstacle surface 1100 and the third obstacle surface 1104 can be between 100% to 200% of the overall width W1 of the robot 100, e.g., between 100% and 150%, 125% and 175%, or 150% and 200% of the overall width W1 of the robot 100. The alley 1101 can correspond to a portion of the floor surface 10 that has a narrow width due to at least two obstacle surfaces defining a portion of the alley 1101 and that are near one another. In the example shown in FIGS. 11A-11F, the first obstacle surface 1100 and the third obstacle surface 1104 can be parallel and can thus define at least in part the alley 1101 along which the robot 100 can move. In some implementations, the first obstacle surface 1100 and the third obstacle surface 1104 are not parallel to one another. Rather, they are angled relative to one another and have a width that is between 100% to 200% of the overall width W1 of the robot 100, e.g., between 100% and 150%, 125% and 175%, or 150% and 200% of the overall width W1 of the robot 100.

The first obstacle surface 1100 and a second obstacle surface 1102 can be adjacent surfaces. The second obstacle surface 1102 can be positioned at an end of the first obstacle surface 1100 and the third obstacle surface 1104. The second obstacle surface 1102 can be perpendicular to the first obstacle surface 1100 and the third obstacle surface 1104. In this regard, the first obstacle surface 1100, the second obstacle surface 1102, and the third obstacle surface 1104 can form the alley 1101 through which the robot 100 can traverse but cannot easily perform an inside corner traversal process similar to that described with respect to the process 800, e.g., along the first obstacle surface 1100 and the second obstacle surface 1102, due to a size of the robot 100 relative to the width W2 of the alley 1101.

In the example shown in FIG. 10, the process 1000 includes operations 1002, 1004, 1006, 1008, 1010. During the process 1000, the robot 100 cleans at least a portion of the alley 1101. For example, the robot 100 can perform an obstacle following behavior in which the robot 100 travels along the first obstacle surface 1100 to clean a portion of the floor surface 10 adjacent to the first obstacle surface 1100 and thus clean a portion of the alley 1101. While FIGS. 10 and 11A-11F are described with respect to the side surface 150 travelling along the first obstacle surface 1100, in other implementations, the robot 100 can be controlled such that the side surface 152 travels along the third obstacle surface 1104.

At the operation 1002, the robot 100 is moved in the forward drive direction F along the first obstacle surface 1100. The robot 100 can be controlled in a manner similar to that described with respect to the operation 1002. In particular, the controller 109 can operate the drive system 110 to move the robot 100 in the forward drive direction F along the first obstacle surface 1100 with the side surface 150 of the robot 100 facing the first obstacle surface 1100.

Figure 11A:
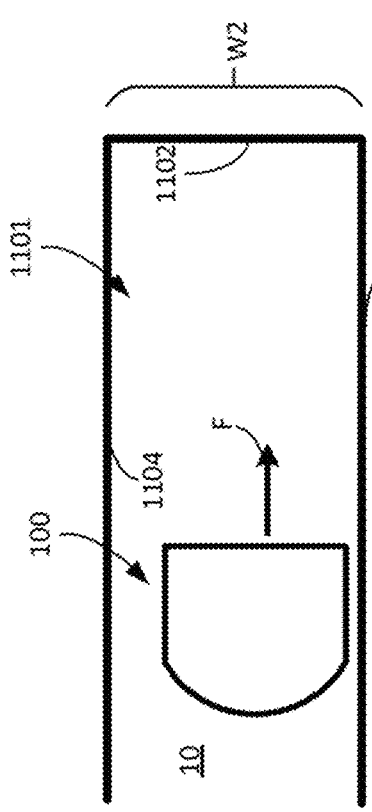
Figure 11B:
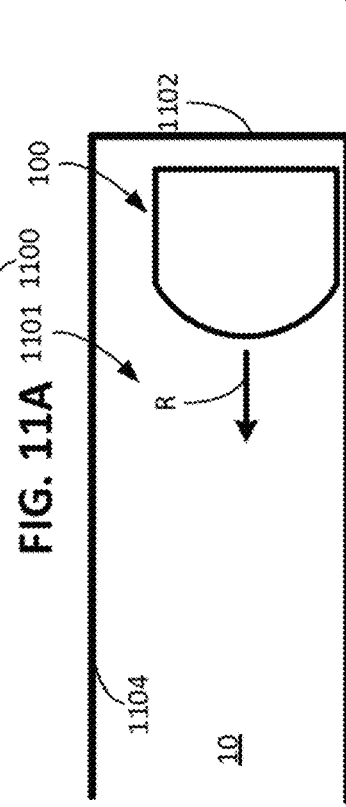

The robot 100 is moved in the forward drive direction F during the operation 1002 until the second obstacle surface 1102 is detected. At the operation 1004, the second obstacle surface 1102 is detected. As shown in FIG. 11B, the robot 100 can detect the second obstacle surface 1102 using one or more of the bump sensors 139a, 139b (shown in FIG. 3B) of the robot 100 and/or using one or more of the proximity sensors 136a, 136b, 136c (shown in FIG. 3B) of the robot 100. This detection can occur in a manner similar to that described with respect to the operation 804. In some implementations, a position of the robot 100 is maintained in a manner similar to that described with respect to the operation 806.

During the operation 1002, the operation 1004, or before the robot 100 enters the alley, the controller 109 can determine whether the first obstacle surface 1100 is part of an alley. The controller 109 can make this determination based on one or more of the proximity sensors 136a, 136b, 136c, based on the map generated by the robot 100 as the robot traverses the floor surface 10 during a cleaning operation, or based on a combination of the foregoing. For example, using the proximity sensor 136a, the controller 109 can determine a distance between the first obstacle surface 1100 and the third obstacle surface 1104, e.g., by using the proximity sensor 136a to determine a width of the second obstacle surface 1102. Using the map, the proximity sensors 136a, 136b, 136c, or a combination thereof, the controller 109 can determine that the maximum width W2 between the first obstacle surface 1100 and the third obstacle surface 1104 is between 100% to 200% of the width W1 of the robot 100, e.g., between 100% and 150%, 125% and 175%, or 150% and 200% of the overall width of the robot 100. If the controller 109 makes such a determination, the controller 109 can initiate the process 1000 rather than the process 800.

Figure 11C:
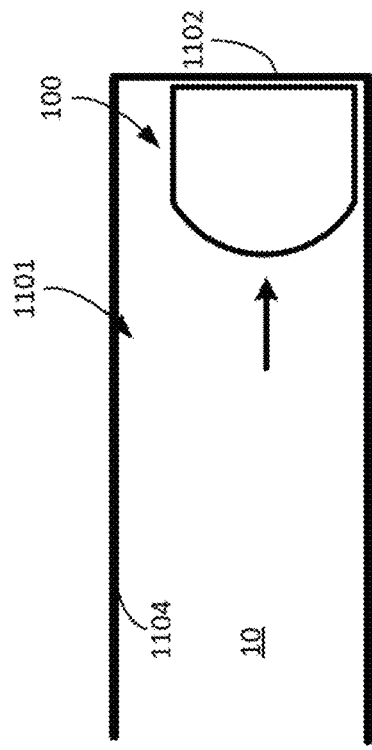

After the robot 100 detects the second obstacle surface 1102, at the operation 1006, as shown in FIG. 11C, the robot 100 is moved in the rearward drive direction R along the first obstacle surface 1100 and away from the second obstacle surface 1102. The controller 109 can move the robot 100 in the rearward drive direction R in a manner similar to that described with respect to the operation 808. In the example shown in FIG. 11C, the robot 100 is moved a certain distance in the rearward drive direction R. This certain distance can be between 1 and 15 centimeters, e.g., 1 to 5 centimeters, 3 to 7 centimeters, 5 to 10 centimeters, or 10 to 15 centimeters.

Figure 11D:
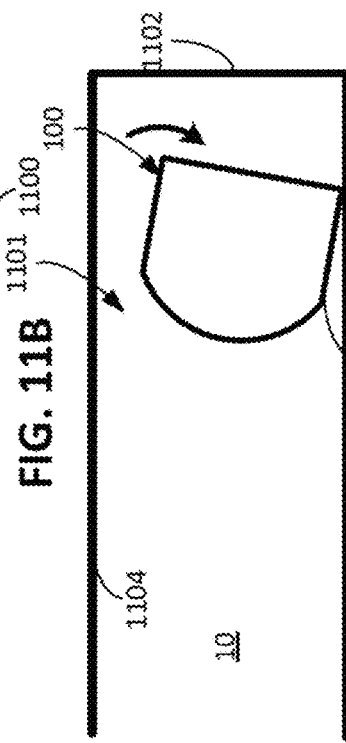

At the operation 1008, as shown in FIG. 11D, the robot 100 is turned such that the forward portion 122 (shown in FIG. 3A) is moved toward the first obstacle surface 1100. The robot 100 can be turned in place until the first obstacle surface 1100 is detected. For example, the controller 109 can determine that there is contact between the robot 100 and the first obstacle surface 1100. This detection can be performed in a manner similar to that described with respect to the operation 814. In particular, one or more of the bump sensors 139a, 139b can be triggered as the side surface 150 of the robot 100 contacts the first obstacle surface 1100. The operation 1108 can confirm that the robot 100 is unable to traverse through the first obstacle surface 1100. For example, in implementations in which the robot 100 can continue rotating upon contacting the first obstacle surface 1100, the controller 109 can determine that the first obstacle surface 1100 is traversable and can therefore move the robot 100 to clean beyond the first obstacle surface 1100.

In some implementations, the obstacle following sensor can be calibrated during this operation. The obstacle following sensor can be calibrated in the manner described with respect to the operation 612.

Figure 11E:
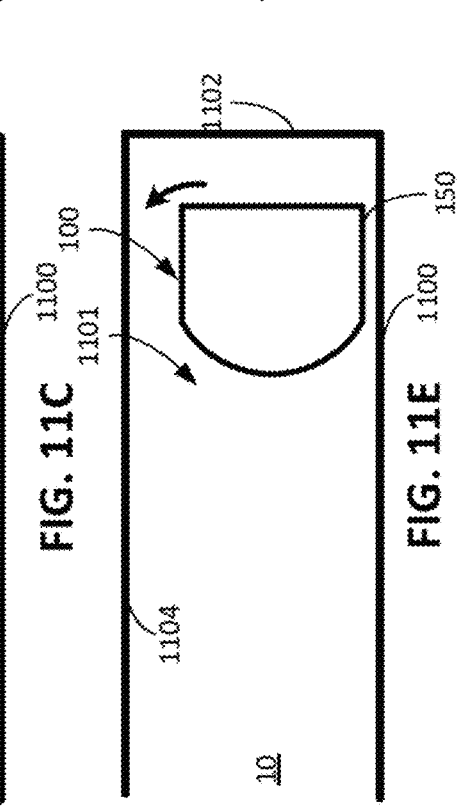

At the operation 1010, as shown in FIG. 11E, the robot 100 is turned such that the forward portion 122 of the robot 100 is moved away from the first obstacle surface 1100. The robot 100 can be turned a sufficient amount to realign the side surface 150 with the first obstacle surface 1100. In some implementations, the robot 100 is turned until the robot 100 no longer detects contact between the robot 100 and the first obstacle surface 1100. For example, the robot 100 can be turned away from the first obstacle surface 1100 until the bump sensors 139a, 139b are released, e.g., no longer detecting contact.

Figure 11F:
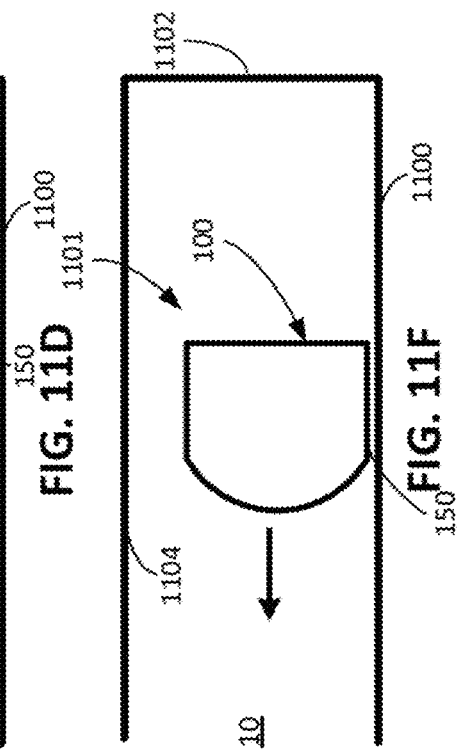

At the operation 1012, as shown in FIG. 11F, the robot 100 is moved in the rearward drive direction R along the first obstacle surface 1100. As the robot 100 is moved in the rearward drive direction R, the controller 109 can operate the drive system 110 to adjust an orientation of the robot 100. Through a process similar to that described with respect to the operation 410, the orientation can be adjusted such that the side surface 150 is aligned with the first obstacle surface 1100 as the robot 100 move along with the first obstacle surface 1100.

Figure 12:
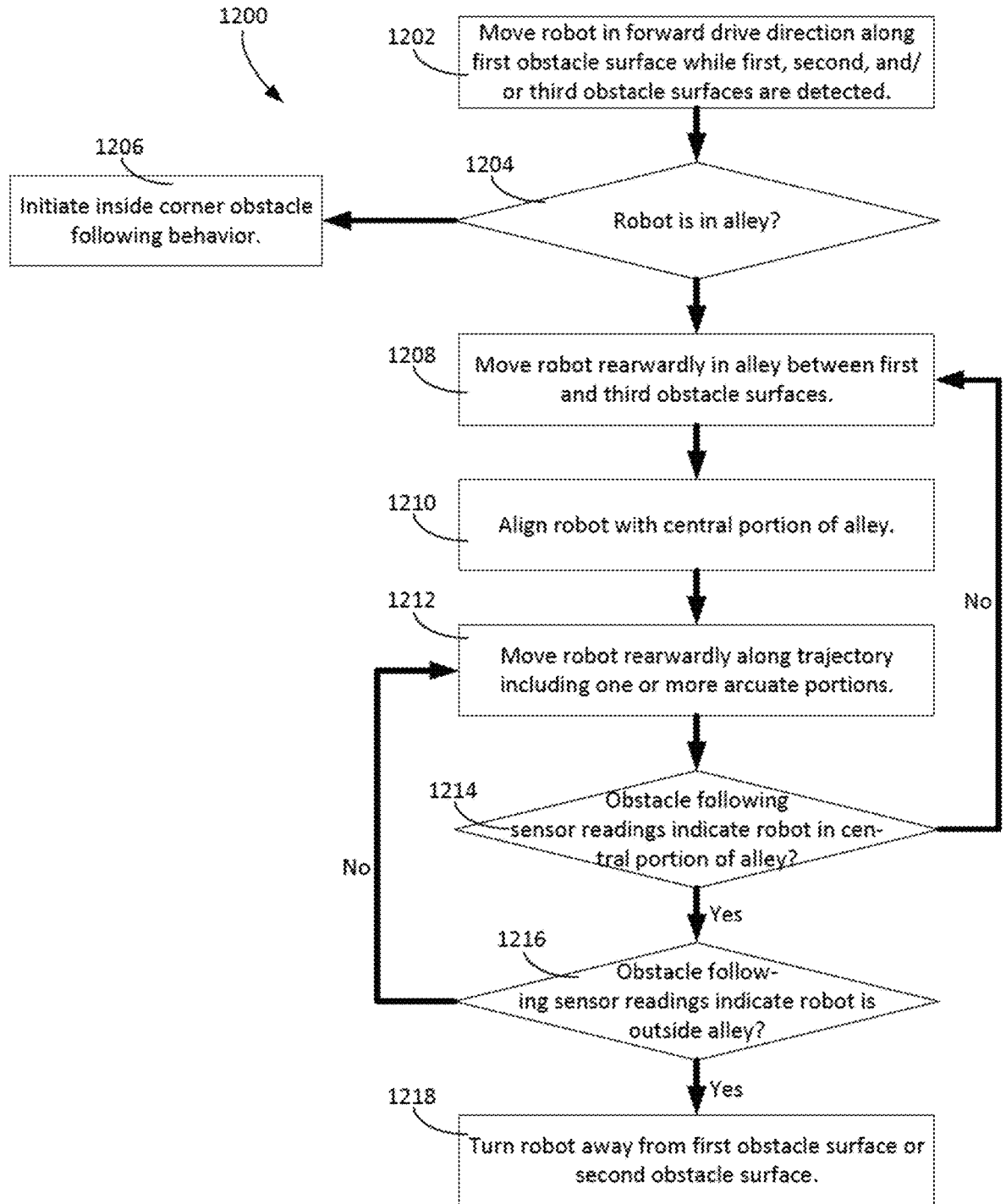

FIG. 12 shows a flowchart illustrating another process 1200 for navigating a robot to follow an obstacle surface and clean an alley 1301 (shown in FIGS. 13A-13C). FIGS. 13A-13C show diagrams of the robot 100 performing operations of the process 1200 to follow a first obstacle surface 1300 positioned a certain distance from a third obstacle surface 1304 with a second obstacle surface 1302 between the first obstacle surface 1300 and the third obstacle surface 1304. The first, second, and third obstacle surfaces 1300, 1302, and 1304 can be arranged in a manner similar to the first, second, and third obstacle surfaces 1100, 1102, and 1104 described with respect to FIGS. 11A-11F. The first, second, and third obstacle surfaces 1300, 1302, 1304 can define at least in part the alley 1301.

In the example shown in FIG. 12, the process 1200 includes operations 1202, 1204, 1206, 1208, 1210, 1212, 1214, 1216, 1218. During the process 1200, the robot 100 cleans a portion of the alley 1301 performs an obstacle following behavior in which the robot 100 travels along the first obstacle surface 1300 to clean a portion of the floor surface 10 adjacent to the first obstacle surface 1300. While FIGS. 10 and 11A-11F are described with respect to the side surface 150 travelling along the first obstacle surface 1300, in other implementations, the robot 100 can be controlled such that the side surface 152 travels along the third obstacle surface 1304.

At the operation 1202, as shown in FIG. 13A, the robot 100 is moved in the forward drive direction F along the first obstacle surface 1300. The robot 100 can be controlled in a manner similar to that described with respect to the operation 1002. In particular, the controller 109 can operate the drive system 110 to move the robot 100 in the forward drive direction F along the first obstacle surface 1100 with the side surface 150 of the robot 100 facing the first obstacle surface 1100.

During this movement in the forward drive direction F, the first, second, and/or third obstacle surfaces 1300, 1302, 1304 can be detected. For example, as the robot 100 moves through the alley 1101 toward the second obstacle surface 1302, left and right obstacle following sensors of the robot 100 can detect the first obstacle surface 1300 and the third obstacle surface 1304. The left and right obstacle following sensors can be optical sensors and can produce readings indicative of a proximity of the third obstacle surface 1304 to the robot 100 and a proximity of the first obstacle surface 1300 to the robot 100. In some implementations, the robot 100 detects the second obstacle surface 1302 in a manner similar to that described with respect to the operation 1004. In addition, as the robot 100 moves through the alley 1101 toward the second obstacle surface 1302, one or more of the proximity sensors 136a, 136b, 136c (shown in FIG. 3B) can be used to detect the first obstacle surface 1300, the second obstacle surface 1302, and the third obstacle surface 1304. For example, in implementation in which the proximity sensor 136a includes the optical detector 180 and the optical emitters 182, 184, the proximity sensor 136a can be used to determine a distance between the first obstacle surface 1300 and the optical detector 180, a distance between the second obstacle surface 1302 and the optical detector 180, and a distance between the third obstacle surface 1304 and the optical detector 180.

At the operation 1204, the robot 100 determines that it is in the alley 1301. For example, the robot 100 can determines that it is unable to turn in place as the robot 100 moves in the forward drive direction F toward the second obstacle surface 1302. In some implementations, the robot 100 determines that a distance between the third obstacle surface 1304 and the side surface 152 of the robot 100 is sufficiently low such that the robot 100 is unable to turn in place a certain amount without contacting the third obstacle surface 1304, the controller 109 can determine that the robot 100 is within an alley and therefore cannot perform an inside corner obstacle following behavior, e.g., cannot perform at least some of the operations associated with the process 800. The certain amount of rotation can be between 30 and 60 degrees, e.g., between 30 and 45 degrees, between 35 and 50 degrees, between 40 and 55 degrees, or between 45 and 60 degrees.

The robot 100 can determine the distance between the third obstacle surface 1304 and the side surface 152 of the robot 100 based on the data collected by the left proximity sensor, the optical detector 180 of the proximity sensor 136a, or a combination thereof. In some implementations, the robot 100 periodically determines whether it is in the alley 1301, e.g., at a certain frequency. The certain frequency can be between 0.1 Hz and 60 Hz, and the controller 109 determines that the robot 100 is unable to turn in place a certain number of instances to determine that the robot 100 is in the alley 1301. This certain number of instances can be a percentage of a total number of readings taken starting from when the robot 100 first detects the robot 100 is within the alley 1301, e.g., 80% to 100% of the total number of determinations made during this period of time.

If the robot 100 determines that it is not within an alley, at the operation 1206, an inside corner obstacle following behavior akin to the behavior of the robot 100 during the process 800 can be initiated. The robot 100 can, for example, be navigated along the second obstacle surface 1302.

If the robot 100 determines that it is within the alley 1301 at the operation 1204, the robot 100 is moved rearwardly in the alley 1301 at the operation 1208, as shown in FIG. 13B. The robot 100 can be navigated along a trajectory 1308. For at least a portion 1308a of the trajectory 1308, the robot 100 can be navigated along the first obstacle surface 1300 and can detect the first obstacle surface 1300 in a manner similar to that described with respect to the operations 1006, 1008, 1010.

At the operation 1210, the robot 100 is aligned within a central portion 1307 of the alley 1301. For example, before the operation 1210 is initiated and after the robot 100 follows the first obstacle surface 1300 through the portion 1308a of the trajectory 1308, the robot 100 is moved toward the central portion 1307 of the alley 1301. The central portion 1307 can correspond to a longitudinally extending portion of the alley 1301 that extends along 30% to 70%, e.g., 30% to 40%, 40% to 50%, 40% to 60%, 50% to 60%, or 60% to 70%, of a width W3 of the alley 1301. The central portion 1307 is centered on a longitudinal axis 1310 of the alley 1301. At the operation 1210, in some implementations, the robot 100 is aligned with the longitudinal axis 1310.

To align the robot 100 with the central portion 1307 or the longitudinal axis 1310, the controller 109 can use the left and right obstacle following sensors, the proximity sensor 136a, or a combination thereof. In some implementations, a difference between a reading produced by the left right obstacle following sensor and a reading produced by the right obstacle following sensor can be maintained within a certain range such that the robot 100 is substantially equidistant from the first obstacle surface 1300 and the third obstacle surface 1304. For example, a distance between the center 162 (shown in FIG. 3C) of the robot 100 and the first obstacle surface 1300 can be between 45% and 55% of the width W3 of the alley 1301, and a distance between the center 162 of the robot 100 and the third obstacle surface 1300 can be between 45% and 55% of the width W3 of the alley 1301.

In some implementations, using the optical detector 180 and the optical emitters 182, 184 of the proximity sensor 136a, the controller 109 determines distances of portions of the first, second, and third obstacle surfaces 1300, 1302, and 1304 on which the optical emitters 182, 184 emit the grids of dots. Because the grids of dots extend across a limited length, the controller 109 can determine a relative length of a detected portion of the first obstacle surface 1300, e.g., the portion of the first obstacle surface 1300 on which dots appear, and a detected portion of the third obstacle surface 1304, e.g., the portion of the third obstacle surface 1304 on which dots appear. To align the robot 100 with the central portion 1307 of the alley 1301, the robot 100 can be navigated such that the length of the detected portion of the first obstacle surface 1300 is substantially equal to the length of the detected portion of the third obstacle surface 1304, e.g., the length of the detected portion of the first obstacle surface 1300 is 90% to 110% of the length of the detected portion of the third obstacle surface 1304.

In some implementations, using the optical detector 180 and the optical emitters 182, 184 of the proximity sensor 136a, the controller 109 determines a slope of distances of dots that appear on the first obstacle surface 1300 and a slope of distances of dots that appear on the third obstacle surface 1304. To align the robot 100 with the central portion 1307 of the alley 1301, the robot 100 can be navigated such that the slopes are substantially equal, e.g., one slope is 90% to 110% of the other slope.

At the operation 1212, the robot 100 is moved rearwardly along a portion 1308b of the trajectory 1308. The portion 1308b of the trajectory 1308 can include one or more arcuate portions that move the robot 100 toward the third obstacle surface 1304 and then back toward the first obstacle surface 1300, or toward the first obstacle surface 1300 and then back toward the third obstacle surface 1304. The one or more arcuate portions can allow the robot 100 to clean a greater portion of the width W3 of the alley 1301 compared to instances in which the robot 100 only follows the first obstacle surface 1300 as the robot 100 moves rearwardly. As the robot 100 moves along the one or more arcuate portions of the portion 1308b of the trajectory 1308, the robot 100 can be maintained at least partially within the central portion 1307 the alley 1301. For example, a distance between the center 162 (shown in FIG. 3C) of the robot 100 and the first obstacle surface 1300 can be between 25% and 75% of the width W3 of the alley 1301, and a distance between the center 162 of the robot 100 and the third obstacle surface 1300 can be between 25% and 75% of the width W3 of the alley 1301. If the one or more arcuate portions include multiple arcuate portions, a radius of curvature for each of the multiple portions can vary from one another.

At the operation 1214, the robot 100 determines whether readings from the obstacle following sensors indicate that the robot 100 is still within the central portion 1307 of the alley 1301. For example, the controller 109 can determine a difference between a reading produced by the right obstacle following sensor and a reading produced by the left obstacle following sensor. If the difference is greater than a certain amount, the controller 109 can determines that the robot 100 is outside the central portion 1307 of the alley 1301. In some implementations, at the operation 1214, the readings indicate that the robot 100 is in the alley 1301 if the reading from the right obstacle following sensor is no more than 1 to 5 times the reading from the left obstacle sensor, e.g., no more than 1 time, 2 times, 3 times, 4 times, or 5 times the reading from the left obstacle sensor, and the reading from the left obstacle following sensor is no more than 3 to 5 times the reading from the right obstacle sensor, e.g., no more than 1 time, 2 times, 3 times, 4 times, or 5 times the reading from the right obstacle sensor. If the robot 100 determines that it is not within the central portion 1307 of the alley 1301 at the operation 1214, the robot 100 continues to be moved rearwardly while having its position aligned with the central portion 1307 through repetition of the operations 1208, 1210, and/or 1212. The robot 100 can be moved in a manner to align with the central portion 1307 such that the difference between the readings from the obstacle following sensors can be reduced.

If the robot 100 determines that it is within the central portion 1307 of the alley 1301, e.g., the difference is less than the certain amount, then the robot 100 at the operation 1216 determines whether the readings from the obstacle following sensors indicate that the robot 100 is outside of the alley 1301. For example, at the operation 1214, the controller 109 may determine that the difference between the readings does not exceed the threshold because the readings are both extremely low, e.g., because the robot 100 has escaped the alley 1301, as shown in FIG. 13C. As a result, the readings indicate that the robot 100 may still be in the central portion 1307 of the alley 1301. In such a circumstance, the controller 109 can determine that the robot 100 is outside of the alley 1301 by determining at the operation 1216 that the readings are no more than a lower threshold. The lower threshold can be, for example, 1% to 25% of a maximum value for readings taken by the obstacle following sensors. If the controller 109 determines that the robot 100 is within the alley 1301, the operations 1212 and 1214 are repeated so that the robot 100 can move further out of the alley 1301.

If the controller 109 determines that the robot 100 is outside of the alley 1301, at the operation 1218, the robot 100 is turned away from the first obstacle surface 1300 or the third obstacle surface 1304. The robot 100 can be turned in a direction of an obstacle surface along which the robot 100 has not previously traversed. For example, if the robot 100 previously traversed along an obstacle surface 1312, the robot 100 turns away from the obstacle surface 1312 and is moved along an obstacle surface 1314. Alternatively, if the robot 100 previously traversed along the obstacle surface 1314, the robot 100 turns away from the obstacle surface 1314 and is moved along an obstacle surface 1314. The robot 100 can perform operations similar to those described with respect to the operations 808, 810, 812, 814, 816 to move along and clean along the obstacle surface 1312, 1314 at the operation 1218.

In some implementations, the first obstacle surface 1300 is longer than the third obstacle surface 1304, or the third obstacle surface 1304 is longer than the first obstacle surface 1300. In such cases, as the robot 100 is moved rearwardly at the operation 1212, the robot 100 may escape the alley 1301 between the first obstacle surface 1300 and the third obstacle surface 1304. In such a circumstance, the difference between the readings of the right obstacle following sensor and the left obstacle following sensor may indicate that the robot 100 is not aligned with the central portion 1307 of the alley. The controller 109 may accordingly continue to repeat the operations 1208, 1210, 1212. In some implementations, to avoid performing these operations when the robot 100 is no longer in the alley 1301, the controller 109 determines that the robot 100 is outside of the alley 1301 based on the proximity sensor 136a rather than the obstacle following sensors. For example, the robot 100 can determine, based on an image taken from the optical detector 180 of the proximity sensor 136a, that one of the first and third obstacle surfaces 1300, 1304 is no longer detectable by the optical detector 180. The controller 109 can accordingly then perform the operation 1218 to turn the robot 100 away from one of the first and third obstacle surfaces 1300, 1304.

Additional Alternative Implementations

A number of implementations, including alternative implementations, have been described. Nevertheless, it will be understood that further alternative implementations are possible, and that various modifications may be made.

The robots described herein can be controlled, at least in part, using one or more computer program products, e.g., one or more computer programs tangibly embodied in one or more information carriers, such as one or more non-transitory machine-readable media, for execution by, or to control the operation of, one or more data processing apparatus, e.g., a programmable processor, a computer, multiple computers, and/or programmable logic components.

Operations and processes associated with controlling the robots and evacuation stations described herein can be performed by one or more programmable processors executing one or more computer programs to perform the functions described herein. A computer program can be written in any form of programming language, including compiled or interpreted languages, and it can be deployed in any form, including as a stand-alone program or as a module, component, subroutine, or other unit suitable for use in a computing environment. Control over all or part of the robots and the evacuation stations described herein can be implemented using special purpose logic circuitry, e.g., an FPGA (field programmable gate array) and/or an ASIC (application-specific integrated circuit).

The controllers (e.g., the controller 109) described herein can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks. While the controller 109 of the robot 100 is described as controlling the drive system 110 and other systems of the robot 100 and performing other operations as described herein, in other implementations, a remote server, or a combination of various controllers described herein can be used to control the operations of the robot 100.

While the robot 100 is described as including a single side brush 126, in other implementations, the robot 100 can include brushes proximate the side surface 150 and the side surface 152, respectively. The brushes can extend beyond the corner surface 156, 158, respectively. The brush 126 is described as being rotatable. In some implementations, the brush 126 is a static brush.

While the robot 100 is described as being a vacuum cleaning robot, in some implementations, the robot 100 is a mopping robot. For example, the cleaning assembly 116 can include a cleaning pad that has a cleaning region corresponding to a footprint of the cleaning pad.

In some implementations described herein, one of the side surfaces 150, 152 is described as being adjacent to or as travelling along an obstacle surface. In other implementations, the other of the side surfaces 150, 152 can be adjacent to or travel along the obstacle surface.

In some implementations, the robot 100 is configured to perform additional behaviors in addition those described herein. For example, the robot 100 can perform a coverage behavior in which the robot 100 traverses an interior portion 40 of a room (shown in FIG. 1). The obstacle following processes described herein can be performed after the robot 100 has performed the coverage behavior. In some implementations, the robot 100 alternates between the coverage behavior and the obstacle following behaviors described herein.

The obstacle surfaces described herein can be part of obstacles on the floor surface 10 or obstacles above the floor surface 10, e.g., overhung obstacles. The obstacle surfaces can include wall surfaces. In some implementations, multiple obstacle surfaces described herein can be part of the same obstacle, e.g., part of the same continuous wall. In some implementations, multiple obstacles surfaces described herein can be part of different obstacles, e.g., a first obstacle surface can be part of an object against a wall surface that forms a second obstacle surface.

Accordingly, other implementations are within the scope of the claims.

What is claimed is:

1. An autonomous cleaning robot comprising:
   a forward portion having a forward surface extending along a forward plane, a first side surface extending along a first side plane, and a second side surface extending along a second side plane, the forward plane being perpendicular to the first side plane and the second side plane;
   a drive system configured to support the cleaning robot on a floor surface;
   a cleaning inlet positioned forward of a center of the cleaning robot and along the forward portion of the cleaning robot between the first side surface and the second side surface, the cleaning inlet configured to collect debris from the floor surface into the cleaning robot; and
   a controller configured to execute instructions to perform operations comprising:
      operating the drive system to move the cleaning robot in a forward drive direction along a first obstacle surface with the first side surface of the cleaning robot facing and being adjacent to the first obstacle surface,
      then operating the drive system to turn the cleaning robot such that the first side surface of the cleaning robot faces and is adjacent to a second obstacle surface, the second obstacle surface adjacent to the first obstacle surface and angled relative to the first obstacle surface,
      then operating the drive system to move the cleaning robot in a rearward drive direction along the second obstacle surface with the first side surface of the cleaning robot facing and being adjacent to the second obstacle surface, and
      then operating the drive system to move the cleaning robot in the forward drive direction along the second obstacle surface with the first side surface of the cleaning robot facing and being adjacent to the second obstacle surface.

2. The cleaning robot of claim 1, wherein operating the drive system to turn the cleaning robot such that the first side surface of the cleaning robot faces and is adjacent to the second obstacle surface comprises operating the drive system to move the cleaning robot along a trajectory comprising an arcuate portion.

3. The cleaning robot of claim 1, wherein:
   the cleaning robot further comprises an obstacle following sensor positioned at a location along the first side surface of the cleaning robot,
   the operations further comprise:
      detecting, using the obstacle following sensor, that the location of the obstacle following sensor is forward of the first obstacle surface, and
   operating the drive system to turn the cleaning robot such that the first side surface of the cleaning robot faces and is adjacent to the second obstacle surface comprises:
      operating the drive system to turn the cleaning robot in response to detecting that the location of the obstacle following sensor is forward of the first obstacle surface.

4. The cleaning robot of claim 3, wherein the obstacle following sensor is positioned to emit a signal in a horizontal direction perpendicular to the first side surface of the cleaning robot.

5. The cleaning robot of claim 3, wherein detecting that the location of the obstacle following sensor is forward of the first obstacle surface comprises:
   detecting that the location of the obstacle following sensor is forward of the first obstacle surface by a distance of at least 1 centimeters to 15 centimeters.

6. The cleaning robot of claim 1, wherein operating the drive system to turn the cleaning robot such that the first side surface of the cleaning robot faces and is adjacent to the second obstacle surface comprises:

operating the drive system to turn the cleaning robot until the cleaning robot detects the second obstacle surface.

7. The cleaning robot of claim 6, wherein operating the drive system to turn the cleaning robot until the cleaning robot detects the second obstacle surface comprises:
detecting, using a bump sensor of the cleaning robot, the second obstacle surface in response to contact between the cleaning robot and the second obstacle surface.

8. The cleaning robot of claim 6, wherein operating the drive system to turn the cleaning robot until the cleaning robot detects the second obstacle surface comprises:
detecting, using an obstacle following sensor of the cleaning robot, the second obstacle surface in response to the first side surface of the cleaning robot being adjacent to the second obstacle surface.

9. The cleaning robot of claim 1, wherein operating the drive system to turn the cleaning robot such that the first side surface of the cleaning robot faces and is adjacent to the second obstacle surface comprises:
operating the drive system to move the cleaning robot along a cleaning path that does not pass through a portion of the floor surface extending from proximate an interface between the first obstacle surface and the second obstacle surface and along the second obstacle surface.

10. The cleaning robot of claim 9, wherein a length of the portion of the floor surface is at least 1 centimeter.

11. The cleaning robot of claim 9, wherein operating the drive system to move the cleaning robot in the rearward drive direction along the second obstacle surface comprises:
operating the drive system to move the cleaning robot in the rearward drive direction through the portion of the floor surface.

12. The cleaning robot of claim 1, wherein operating the drive system to move the cleaning robot in the rearward drive direction along the second obstacle surface comprises:
operating the drive system to move the cleaning robot a distance in the rearward drive direction.

13. The cleaning robot of claim 12, wherein the distance is between 1 centimeter and 60 centimeters.

14. The cleaning robot of claim 12, wherein:
the cleaning robot further comprises an obstacle following sensor positioned at a location along the first side surface of the cleaning robot,
the operations further comprise:
detecting, using the obstacle following sensor, that the location of the obstacle following sensor is rearward of the second obstacle surface, and
operating the drive system to move the cleaning robot in the forward drive direction along the second obstacle surface comprises:
operating the drive system to move the cleaning robot in the forward drive direction along the second obstacle surface in response to detecting that the location of the obstacle following sensor is rearward of the second obstacle surface.

15. The cleaning robot of claim 1, wherein operating the drive system to move the cleaning robot in the forward drive direction along the second obstacle surface comprises:
operating the drive system to turn the cleaning robot away from the second obstacle surface and move the cleaning robot in the forward drive direction such that the forward drive direction of the cleaning robot is angled relative to the second obstacle surface and such that the first side surface of the cleaning robot moves away from the second obstacle surface as the cleaning robot moves in the forward drive direction.

16. The cleaning robot of claim 15, wherein:
the cleaning robot further comprises an obstacle following sensor positioned along the first side surface of the cleaning robot,
the operations further comprise detecting, using the obstacle following sensor, the second obstacle surface, and
operating the drive system to turn the cleaning robot away from the second obstacle surface and move the cleaning robot in the forward drive direction such that the forward drive direction of the cleaning robot is angled relative to the second obstacle surface and such that the first side surface of the cleaning robot moves away from the second obstacle surface as the cleaning robot moves in the forward drive direction comprises:
operating the drive system to move the cleaning robot in the forward drive direction until detecting the second obstacle surface.

17. The cleaning robot of claim 15, wherein operating the drive system to turn the cleaning robot away from the second obstacle surface and move the cleaning robot in the forward drive direction such that the forward drive direction of the cleaning robot is angled relative to the second obstacle surface and such that the first side surface of the cleaning robot moves away from the second obstacle surface as the cleaning robot moves in the forward drive direction comprises:
operating the drive system to move the cleaning robot in the forward drive direction for a distance.

18. The cleaning robot of claim 17, wherein the distance is between 50% and 150% of a length of the cleaning robot.

19. The cleaning robot of claim 15, wherein the operations further comprise:
operating the drive system to turn the cleaning robot toward the second obstacle surface in response to detecting the second obstacle surface, and
then operating the drive system to move the cleaning robot along the second obstacle surface.

20. The cleaning robot of claim 1, further comprising a rotatable cleaning member positioned adjacent to the cleaning inlet, the rotatable cleaning member extending horizontally across the forward portion of the cleaning robot and rotatable about a horizontal axis to move debris toward the cleaning inlet.

21. The cleaning robot of claim 20, wherein the rotatable cleaning member extends across 75% to 95% of a total width of the cleaning robot.

22. An autonomous cleaning robot comprising:
a forward portion having a forward surface extending along a forward plane, a first side surface extending along a first side plane, and a second side surface extending along a second side plane, the forward plane being perpendicular to the first side plane and the second side plane;
a drive system configured to support the cleaning robot on a floor surface;
a cleaning inlet positioned forward of a center of the cleaning robot and along the forward portion of the cleaning robot between the first side surface and the second side surface, the cleaning inlet configured to collect debris from the floor surface into the cleaning robot; and
a controller configured to execute instructions to perform operations comprising:
operating the drive system to move the cleaning robot in a forward drive direction along a first obstacle surface with the first side surface of the cleaning robot facing and being adjacent to the first obstacle surface, then operating the drive system to repeatedly cause the cleaning robot to perform a series of movements comprising:

moving in a rearward drive direction a distance along the first obstacle surface with the first side surface of the cleaning robot facing and being adjacent to the first obstacle surface, then turning away from the first obstacle surface until the cleaning robot detects contact between a second obstacle surface and a forward surface of the cleaning robot, the second obstacle surface being adjacent to the first obstacle surface and angled relative to the first obstacle surface, and then turning back toward the first obstacle surface, and then operating the drive system to move the cleaning robot in the forward drive direction along the second obstacle surface with the first side surface of the cleaning robot facing and being adjacent to the second obstacle surface.

23. The cleaning robot of claim 22, wherein operating the drive system to move the cleaning robot in the forward drive direction along the first obstacle surface with the first side surface of the cleaning robot facing and being adjacent to the first obstacle surface comprises:

operating the drive system to move the cleaning robot in the forward drive direction until the cleaning robot detects the second obstacle surface.

24. The cleaning robot of claim 23, wherein operating the drive system to move the cleaning robot in the forward drive direction until the cleaning robot detects the second obstacle surface comprises:

detecting, using a bump sensor of the cleaning robot, the second obstacle surface in response to contact between the second obstacle surface and the cleaning robot.

25. The cleaning robot of claim 23, wherein the operations further comprise:

operating the drive system to maintain a position of the cleaning robot for at least one to five seconds in response to detecting the second obstacle surface.

26. The cleaning robot of claim 25, further comprising a side brush positioned proximate the forward surface of the cleaning robot and proximate the first side surface of the cleaning robot, wherein operating the drive system to maintain a position of the cleaning robot for at least one to five seconds in response to detecting the second obstacle surface comprises:

operating the drive system to maintain a portion of the floor surface adjacent to an interface between the first obstacle surface and the second obstacle surface within a cleaning region of the side brush.

27. The cleaning robot of claim 23, wherein operating the drive system to move the cleaning robot in the forward drive direction until the cleaning robot detects the second obstacle surface comprises:

emitting a signal toward the second obstacle surface, and detecting the second obstacle surface by detecting, using a camera, a reflection of the signal.

28. The cleaning robot of claim 22, wherein the distance is between 2 and 15 centimeters.

29. The cleaning robot of claim 22, wherein operating the drive system to repeatedly cause the cleaning robot to perform the series of movements comprises:

operating the drive system to cause the cleaning robot to perform the series of movements at least two to five times.

30. The cleaning robot of claim 22, wherein operating the drive system to repeatedly cause the cleaning robot to perform the series of movements comprises:

operating the drive system to cause the cleaning robot to perform the series of movements until the forward drive direction of the cleaning robot and the first obstacle surface form an angle.

31. The cleaning robot of claim 30, wherein the angle is at least 30 to 60 degrees.

32. The cleaning robot of claim 22, further comprising a side brush positioned proximate the forward surface of the cleaning robot and proximate the first side surface of the cleaning robot, wherein operating the drive system to repeatedly cause the cleaning robot to perform the series of movements comprises:

causing the side brush to traverse a region of the floor surface extending along the second obstacle surface from proximate an interface between the first obstacle surface and the second obstacle surface.

33. The cleaning robot of claim 32, wherein causing the side brush to traverse the region of the floor surface comprises:

causing a cleaning region of the side brush to traverse a different portion of the region of the floor surface each time the cleaning robot turns away from the first obstacle surface until the cleaning robot detects contact between the second obstacle surface and the cleaning robot.

34. The cleaning robot of claim 22, wherein the series of movements of the cleaning robot further comprises, after turning back toward the first obstacle surface, turning the cleaning robot away from the first obstacle surface.

35. An autonomous cleaning robot comprising:

a forward portion having a forward surface extending along a forward plane, a first side surface extending along a first side plane, and a second side surface extending along a second side plane, the forward plane being perpendicular to the first side plane and the second side plane;

a drive system configured to support the cleaning robot on a floor surface;

a cleaning inlet positioned forward of a center of the cleaning robot and along the forward portion of the cleaning robot between the first side surface and the second side surface, the cleaning inlet configured to collect debris from the floor surface into the cleaning robot; and a controller configured to execute instructions to perform operations comprising:

operating the drive system to move the cleaning robot in a forward drive direction along a first obstacle surface with the first side surface of the cleaning robot facing and being adjacent to the first obstacle surface until the cleaning robot detects contact between a second obstacle surface and the cleaning robot, the first obstacle surface positioned a distance from a third obstacle surface no more than 100% to 150% of an overall width of the cleaning robot, then operating the drive system to move the cleaning robot away from the second obstacle surface along a rearward drive direction, then operating the drive system to turn the cleaning robot toward the first obstacle surface and then away from the first obstacle surface, and then operating the drive system to move the cleaning robot in a rearward drive direction along the first obstacle surface with the first side surface of the cleaning robot facing and being adjacent to the first obstacle surface.

36. The cleaning robot of claim 35, further comprising a sensor system configured to generate a map of the floor surface, wherein the operations further comprise determining, based on the map, that the distance between the first obstacle surface and the third obstacle surface is between 100% and 150% of the overall width of the cleaning robot, and wherein operating the drive system to turn the cleaning robot toward the first obstacle surface and then away from the first obstacle surface comprises:

operating the drive system to turn the cleaning robot toward the first obstacle surface and then away from the first obstacle surface in response to determining that the distance is between 100% and 150% of the overall width of the cleaning robot.

37. The cleaning robot of claim 35, wherein operating the drive system to turn the cleaning robot toward the first obstacle surface and then away from the first obstacle surface comprises:

operating the drive system to turn the cleaning robot toward the first obstacle surface until a bump sensor of the cleaning robot detects contact between the cleaning robot and the first obstacle surface.

38. The cleaning robot of claim 37, wherein operating the drive system to turn the cleaning robot toward the first obstacle surface and then away from the first obstacle surface comprises:

operating the drive system to turn the cleaning robot away from the first obstacle surface until the bump sensor of the cleaning robot no longer detects contact between the cleaning robot and the first obstacle surface.

* * * * *